United States Patent
Park et al.

(10) Patent No.: US 11,100,863 B2
(45) Date of Patent: Aug. 24, 2021

(54) DISPLAY APPARATUS AND METHOD OF DRIVING DISPLAY PANEL FOR REDUCING POWER CONSUMPTION AND ENHANCING DISPLAY QUALITY WHEN DISPLAYING STATIC IMAGES

(71) Applicant: Samsung Display Co., Ltd., Yongin-si (KR)

(72) Inventors: Geunjeong Park, Hwaseong-si (KR); Eunho Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/739,606

(22) Filed: Jan. 10, 2020

(65) Prior Publication Data

US 2020/0226980 A1    Jul. 16, 2020

(30) Foreign Application Priority Data

Jan. 14, 2019   (KR) .......................... 10-2019-0004826

(51) Int. Cl.
    *G09G 3/3258*        (2016.01)

(52) U.S. Cl.
    CPC ... *G09G 3/3258* (2013.01); *G09G 2320/0223* (2013.01); *G09G 2320/0247* (2013.01); *G09G 2320/0257* (2013.01); *G09G 2330/021* (2013.01)

(58) Field of Classification Search
    CPC ......... G09G 3/3258; G09G 2320/0223; G09G 2320/0247; G09G 2320/0257; G09G 2330/021; G09G 2340/0435
    See application file for complete search history.

(56) References Cited

U.S. PATENT DOCUMENTS

| | | | | |
|---|---|---|---|---|
| 2002/0180673 A1* | 12/2002 | Tsuda | ................... | G09G 3/3258 345/87 |
| 2006/0007194 A1* | 1/2006 | Verschueren | ........ | G09G 3/3611 345/204 |
| 2010/0134473 A1* | 6/2010 | Matsuda | .............. | G09G 3/3677 345/213 |
| 2012/0162159 A1* | 6/2012 | Kim | ..................... | G09G 3/3233 345/204 |

(Continued)

FOREIGN PATENT DOCUMENTS

| | | |
|---|---|---|
| KR | 10-2015-0059385 A | 6/2015 |
| KR | 10-2016-0015451 A | 2/2016 |
| KR | 10-2017-0091139 A | 8/2017 |

OTHER PUBLICATIONS

EPO Extended Search Report dated Mar. 2, 2020, for corresponding for European Patent Application No. 20151835.4 (14 pages).

*Primary Examiner* — Laurence J Lee
(74) *Attorney, Agent, or Firm* — Lewis Roca Rothgerber Christie LLP

(57) ABSTRACT

A display apparatus configured to adjust a driving frequency of a display panel by including a driving controller configured to: determine a low driving frequency corresponding to input image data; determine a plurality of compensation frequencies greater than the low driving frequency; and insert a plurality of compensation frequency frames having the compensation frequencies prior to a low driving frequency frame having the low driving frequency in a low frequency driving mode.

20 Claims, 16 Drawing Sheets

(56) References Cited

U.S. PATENT DOCUMENTS

| | | | |
|---|---|---|---|
| 2014/0333673 A1* | 11/2014 | Cho | G09G 3/3406 |
| | | | 345/660 |
| 2014/0375627 A1 | 12/2014 | Kim et al. | |
| 2015/0049126 A1 | 2/2015 | Jung | |
| 2016/0189616 A1* | 6/2016 | Oh | G09G 3/3648 |
| | | | 345/209 |
| 2017/0323610 A1* | 11/2017 | Lin | G09G 3/3688 |
| 2018/0048853 A1 | 2/2018 | Koh et al. | |
| 2018/0061915 A1* | 3/2018 | Yu | H01L 51/5203 |

* cited by examiner

FIG. 7

| FIRST COMPENSATION FREQUENCY | 60Hz |
|---|---|
| SECOND COMPENSATION FREQUENCY | 30Hz |
| THIRD COMPENSATION FREQUENCY | 15Hz |
| FOURTH COMPENSATION FREQUENCY | 7.5Hz |
| FIFTH COMPENSATION FREQUENCY | 3.75Hz |
| SIXTH COMPENSATION FREQUENCY | 1.875Hz |

FIG. 10

| FIRST COMPENSATION FREQUENCY | 60Hz |
|---|---|
| SECOND COMPENSATION FREQUENCY | 30Hz |
| THIRD COMPENSATION FREQUENCY | 15Hz |
| FOURTH COMPENSATION FREQUENCY | 7.5Hz |
| FIFTH COMPENSATION FREQUENCY | 4Hz |
| SIXTH COMPENSATION FREQUENCY | 2Hz |

DISPLAY APPARATUS AND METHOD OF DRIVING DISPLAY PANEL FOR REDUCING POWER CONSUMPTION AND ENHANCING DISPLAY QUALITY WHEN DISPLAYING STATIC IMAGES

CROSS-REFERENCE TO RELATED APPLICATION

This application claims priority to and the benefit of Korean Patent Application No. 10-2019-0004826, filed on Jan. 14, 2019 in the Korean Intellectual Property Office KIPO, the contents of which are herein incorporated by reference in their entireties.

BACKGROUND

1. Field

Aspects of some example embodiments of the present inventive concept relate to a display apparatus and a method of driving a display panel using the display apparatus.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver, and the emission driver.

When the display panel displays a static image or the display panel is operated in Always On Mode, a driving frequency of the display panel may be reduced to reduce the power consumption.

When the display panel displays the static image and the image transition occurs, an afterimage of the previous static image may be generated or the flicker may be generated due to hysteresis characteristics of pixel switching elements.

The above information disclosed in this Background section is only for enhancement of understanding of the background and therefore it may contain information that does not constitute prior art.

SUMMARY

Aspects of some example embodiments of the present inventive concept relate to a display apparatus and a method of driving a display panel using the display apparatus. For example, some example embodiments of the present inventive concept relate to a display apparatus that may be capable of reducing power consumption and enhancing a display quality and a method of driving a display panel using the display apparatus.

Some example embodiments of the present inventive concept provide a display apparatus capable of reducing a power consumption of a display apparatus and enhancing a display quality of a display panel.

Some example embodiments of the present inventive concept also provide a method of driving a display panel using the display apparatus.

According to some example embodiments of the present invention concept, a display apparatus includes a display panel, a gate driver, a data driver, an emission driver and a driving controller. The display panel includes a pixel comprising a switching element of a first type and a switching element of a second type different from the first type. The gate driver is configured to output a gate signal to the display panel. The data driver is configured to output a data voltage to the display panel. The emission driver is configured to output an emission signal to the display panel. The driving controller is configured to determine a low driving frequency corresponding to input image data, to determine a plurality of compensation frequencies greater than the low driving frequency, and to insert a plurality of compensation frequency frames having the compensation frequencies prior to a low driving frequency frame having the low driving frequency in a low frequency driving mode.

According to some example embodiments, the switching element of the second type may be driven in the low driving frequency and the switching element of the first type may be driven in a first driving frequency greater than the low driving frequency in the low frequency driving mode.

According to some example embodiments, the switching element of the first type and the switching element of the second type may be driven in a normal driving frequency in a normal driving mode.

According to some example embodiments, the first driving frequency may be the normal driving frequency.

According to some example embodiments, the driving controller may be configured to determine a first compensation frequency and a second compensation frequency. The first compensation frequency may be a normal driving frequency of a normal driving mode. The second compensation frequency may be less than the normal driving frequency and greater than the low driving frequency.

According to some example embodiments, the driving controller may be configured to determine a first compensation frequency and a second compensation frequency less than the first compensation frequency. A first compensation frequency frame having the first compensation frequency may be inserted prior to a second compensation frequency frame having the second compensation frequency.

According to some example embodiments, the driving controller may be configured to determine a first compensation frequency and a second compensation frequency less than the first compensation frequency. A plurality of first compensation frequency frames having the first compensation frequency may be inserted. A plurality of second compensation frequency frames having the second compensation frequency may be inserted.

According to some example embodiments, the compensation frequency frames having at least two compensation frequencies may be repetitively inserted until a predetermined count is satisfied.

According to some example embodiments, the compensation frequency frames having at least two compensation frequencies may be repetitively inserted until a predetermined condition is satisfied.

According to some example embodiments, the driving controller may be configured to insert the compensation frequency frames when an image transition of the input image data occurs from a first static image to a second static image different from the first static image.

According to some example embodiments, the driving controller may be configured to generate the compensation frequencies by repetitively dividing a normal driving frequency of a normal driving mode by a parameter.

According to some example embodiments, the driving controller may be configured to determine the normal driving frequency as a first compensation frequency. The driving controller may be configured to determine a second compensation frequency by dividing the normal driving frequency by the parameter when the second compensation frequency is greater than the low driving frequency. The driving controller may be configured to determine a third compensation frequency by dividing the second driving frequency by the parameter when the third compensation frequency is greater than the low driving frequency.

According to some example embodiments, the driving controller may be configured to generate the compensation frequencies by repetitively multiplying a parameter to the low driving frequency.

According to some example embodiments, the driving controller may be configured to determine an N-th compensation frequency by multiplying the parameter to the low driving frequency when the N-th compensation frequency is less than a normal driving frequency of a normal driving mode. The driving controller may be configured to determine a (N−1)-th compensation frequency by multiplying the parameter to the N-th compensation frequency when the (N−1)-th compensation frequency is less than the normal driving frequency. N is a natural number equal to or greater than two.

According to some example embodiments, the switching element of the first type may be a polysilicon thin film transistor. The switching element of the second type may be an oxide thin film transistor.

According to some example embodiments, the switching element of the first type may be a P-type transistor. The switching element of the second type may be an N-type transistor.

According to some example embodiments, the pixel may include a first pixel switching element comprising a control electrode connected to a first node, an input electrode connected to a second node and an output electrode connected to a third node, a second pixel switching element comprising a control electrode to which a first data write gate signal is applied, an input electrode to which the data voltage is applied and an output electrode connected to the second node, a third pixel switching element comprising a control electrode to which a second data write gate signal is applied, an input electrode connected to the first node and an output electrode connected to the third node, a fourth pixel switching element comprising a control electrode to which a data initialization gate signal is applied, an input electrode to which an initialization voltage is applied and an output electrode connected to the first node, a fifth pixel switching element comprising a control electrode to which the emission signal is applied, an input electrode to which a high power voltage is applied and an output electrode connected to the second node, a sixth pixel switching element comprising a control electrode to which the emission signal is applied, an input electrode connected to the third node and an output electrode connected to an anode electrode of an organic light emitting element, a seventh pixel switching element comprising a control electrode to which an organic light emitting element initialization gate signal is applied, an input electrode to which the initialization voltage is applied and an output electrode connected to the anode electrode of the organic light emitting element, a storage capacitor comprising a first electrode to which the high power voltage is applied and a second electrode connected to the first node and the organic light emitting element comprising the anode electrode connected to the output electrode of the sixth switching element and a cathode electrode to which a low power voltage is applied.

According to some example embodiments, the first pixel switching element, the second pixel switching element, the fifth pixel switching element and the sixth pixel switching element may be the polysilicon thin film transistors. The third pixel switching element, the fourth pixel switching element and the seventh pixel switching element may be the oxide thin film transistors.

According to some example embodiments, the first pixel switching element, the second pixel switching element, the fifth pixel switching element, the sixth pixel switching element and the seventh pixel switching element may be the polysilicon thin film transistors. The third pixel switching element and the fourth pixel switching element may be the oxide thin film transistors.

According to some example embodiments of the present inventive concept, in a method of driving a display panel, the method includes determining a low driving frequency corresponding to input image data in a low frequency driving mode, determining a plurality of compensation frequencies greater than the low driving frequency in the low frequency driving mode, outputting a gate signal to the display panel comprising a pixel comprising a switching element of a first type and a switching element of a second type different from the first type based on the low driving frequency and the compensation frequencies, outputting a data voltage to the display panel and outputting an emission signal to the display panel. A plurality of compensation frequency frames having the compensation frequencies is inserted prior to a low driving frequency frame having the low driving frequency in the low frequency driving mode.

According to some example embodiments, in a display apparatus and a method of driving the display panel, a plurality of compensation frequency frames may be inserted prior to a low driving frequency frame in a low frequency driving mode so that instances of an afterimage of the previous image or the flicker due to the hysteresis characteristics of the pixel switching elements may be prevented or reduced.

According to some example embodiments, instances of flicker of the display panel may be prevented or reduced in the low frequency driving mode so that the power consumption of the display apparatus may be reduced and the display quality of the display panel may be enhanced.

BRIEF DESCRIPTION OF THE DRAWINGS

The above and other features and characteristics of the present inventive concept will become more apparent by describing aspects of some example embodiments thereof with reference to the accompanying drawings, in which:

FIG. 7 is a table illustrating compensation frequencies for driving the display panel of FIG. 1;

FIG. 10 is a table illustrating compensation frequencies for driving a display panel according to some example embodiments of the present inventive concept;

DETAILED DESCRIPTION

Hereinafter, aspects of some example embodiments of the present inventive concept will be explained in more detail with reference to the accompanying drawings.

Figure 1:
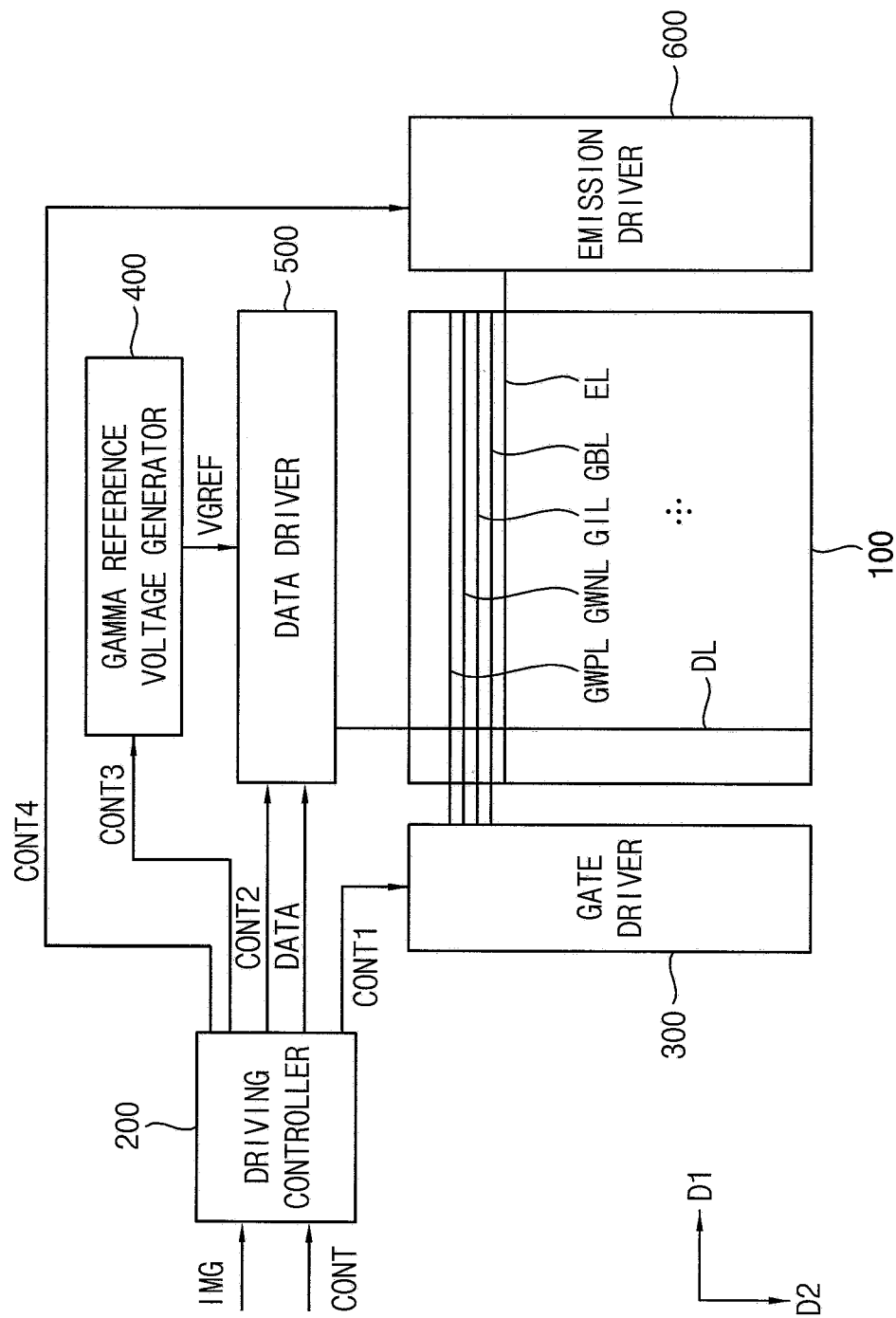
FIG. 1 is a block diagram illustrating a display apparatus according to some example embodiments of the present inventive concept.

FIG. 1 is a block diagram illustrating a display apparatus according to some example embodiments of the present inventive concept.

Referring to FIG. 1, the display apparatus includes a display panel 100 and a display panel driver. The display panel driver includes a driving controller 200, a gate driver 300, a gamma reference voltage generator 400, a data driver 500, and an emission driver 600.

The display panel 100 has a display region on which an image is displayed and a peripheral region adjacent to the display region.

The display panel 100 includes a plurality of gate lines GWPL, GWNL, GIL and GBL, a plurality of data lines DL, a plurality of emission lines EL, and a plurality of pixels electrically connected to the gate lines GWPL, GWNL, GIL, and GBL, the data lines DL and the emission lines EL. The gate lines GWPL, GWNL, GIL, and GBL may extend in a first direction D1, the data lines DL may extend in a second direction D2 crossing the first direction D1, and the emission lines EL may extend in the first direction D1.

The driving controller 200 receives input image data IMG and an input control signal CONT from an external apparatus. For example, the input image data IMG may include red image data, green image data, and blue image data. The input image data IMG may include white image data. The input image data IMG may include magenta image data, cyan image data, and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4, and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWPL, GWNL, GIL and GBL in response to the first control signal CONT1 received from the driving controller 200. The gate driver 300 may sequentially output the gate signals to the gate lines GWPL, GWNL, GIL, and GBL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

According to some example embodiments, the gamma reference voltage generator 400 may be located in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL.

Figure 2:
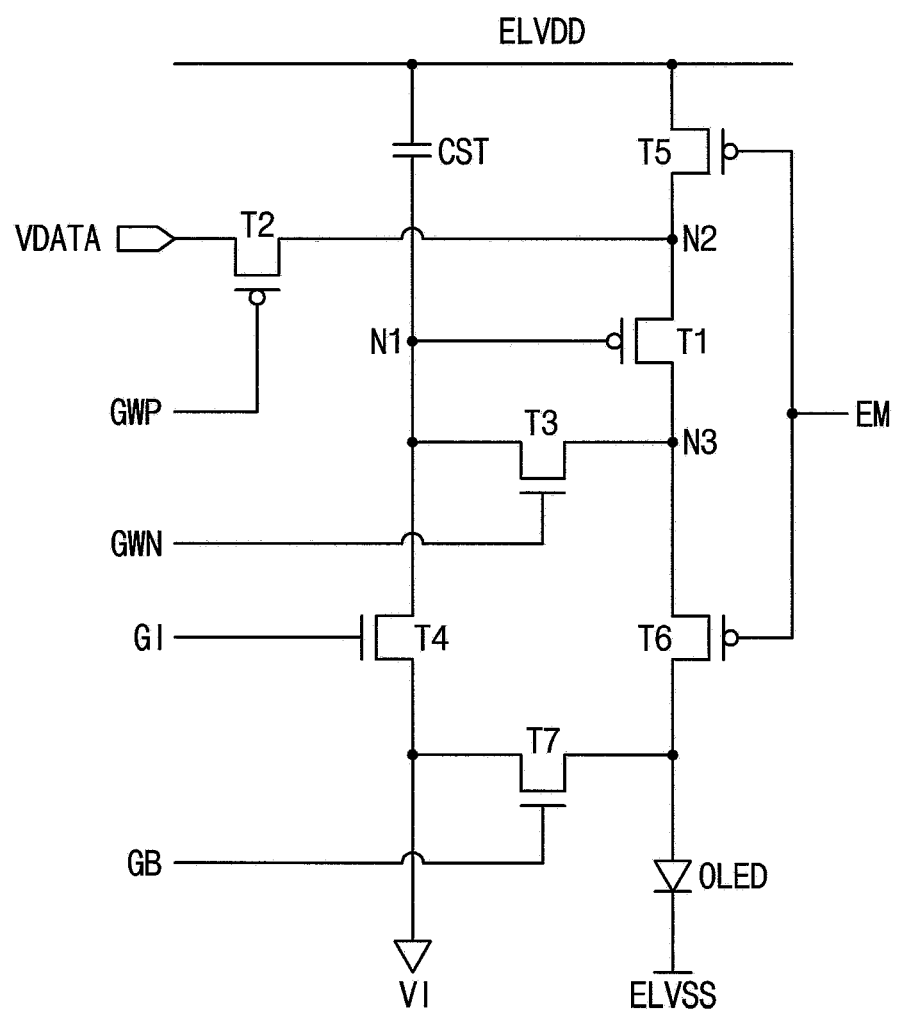
FIG. 2 is a circuit diagram illustrating a pixel of a display panel of FIG. 1.
Figure 3:
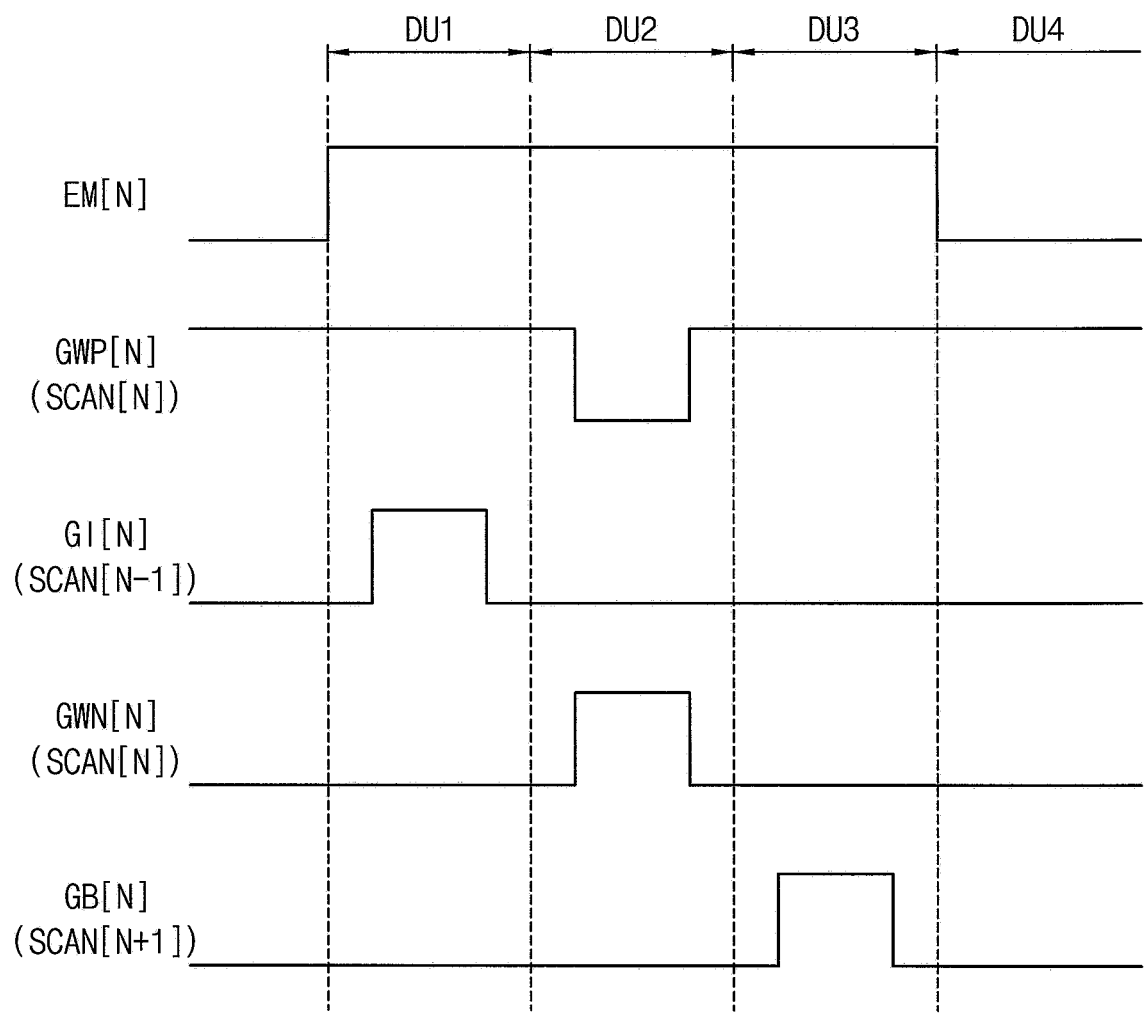
FIG. 3 is a timing diagram illustrating input signals applied to the pixel of FIG. 2.

FIG. 2 is a circuit diagram illustrating a pixel of the display panel 100 of FIG. 1. FIG. 3 is a timing diagram illustrating input signals applied to the pixel of FIG. 2.

Referring to FIGS. 1 to 3, the display panel 100 includes the plurality of the pixels. Each pixel includes an organic light emitting element OLED.

The pixel receives a data write gate signal GWP and GWN, a data initialization gate signal GI, an organic light emitting element initialization signal GB, the data voltage VDATA and the emission signal EM and the organic light emitting element OLED of the pixel emits light corresponding to the level of the data voltage VDATA to display the image.

According to some example embodiments, the pixel may include a switching element of a first type and a switching element of a second type different from the first type. For example, the switching element of the first type may be a polysilicon thin film transistor. For example, the switching element of the first type may be a low temperature polysilicon (LTPS) thin film transistor. For example, the switching element of the second type may be an oxide thin film transistor. For example, the switching element of the first type may be a P-type transistor and the switching element of the second type may be an N-type transistor.

For example, the data write gate signal may include a first data write gate signal GWP and a second data write gate signal GWN. The first data write gate signal GWP may be applied to the P-type transistor so that the first data write gate signal GWP has an activation signal of a low level corresponding to a data writing timing. The second data write gate signal GWN may be applied to the N-type transistor so that the second data write gate signal GWN has an activation signal of a high level corresponding to the data writing timing.

At least one of the pixels may include first to seventh pixel switching elements T1 to T7, a storage capacitor CST and the organic light emitting element OLED.

The first pixel switching element T1 includes a control electrode connected to a first node N1, an input electrode connected to a second node N2 and an output electrode connected to a third node N3.

For example, the first pixel switching element T1 may be the polysilicon thin film transistor. For example, the first pixel switching element T1 may be the P-type thin film transistor. The control electrode of the first pixel switching element T1 may be a gate electrode, the input electrode of the first pixel switching element T1 may be a source electrode and the output electrode of the first pixel switching element T1 may be a drain electrode.

The second pixel switching element T2 includes a control electrode to which the first data write gate signal GWP is applied, an input electrode to which the data voltage VDATA is applied and an output electrode connected to the second node N2.

For example, the second pixel switching element T2 may be the polysilicon thin film transistor. For example, the second pixel switching element T2 may be the P-type thin film transistor. The control electrode of the second pixel switching element T2 may be a gate electrode, the input electrode of the second pixel switching element T2 may be a source electrode and the output electrode of the second pixel switching element T2 may be a drain electrode.

The third pixel switching element T3 includes a control electrode to which the second data write gate signal GWN is applied, an input electrode connected to the first node N1 and an output electrode connected to the third node N3.

For example, the third pixel switching element T3 may be the oxide thin film transistor. For example, the third pixel switching element T3 may be the N-type thin film transistor. The control electrode of the third pixel switching element T3 may be a gate electrode, the input electrode of the third pixel switching element T3 may be a source electrode and the output electrode of the third pixel switching element T3 may be a drain electrode.

The fourth pixel switching element T4 includes a control electrode to which the data initialization gate signal GI is applied, an input electrode to which an initialization voltage VI is applied and an output electrode connected to the first node N1.

For example, the fourth pixel switching element T4 may be the oxide thin film transistor. For example, the fourth pixel switching element T4 may be the N-type thin film transistor. The control electrode of the fourth pixel switching element T4 may be a gate electrode, the input electrode of the fourth pixel switching element T4 may be a source electrode and the output electrode of the fourth pixel switching element T4 may be a drain electrode.

The fifth pixel switching element T5 includes a control electrode to which the emission signal EM is applied, an input electrode to which a high power voltage ELVDD is applied and an output electrode connected to the second node N2.

For example, the fifth pixel switching element T5 may be the polysilicon thin film transistor. For example, the fifth pixel switching element T5 may be the P-type thin film transistor. The control electrode of the fifth pixel switching element T5 may be a gate electrode, the input electrode of the fifth pixel switching element T5 may be a source electrode and the output electrode of the fifth pixel switching element T5 may be a drain electrode.

The sixth pixel switching element T6 includes a control electrode to which the emission signal EM is applied, an input electrode connected to the third node N3 and an output electrode connected to an anode electrode of the organic light emitting element OLED.

For example, the sixth pixel switching element T6 may be the polysilicon thin film transistor. For example, the sixth pixel switching element T6 may be a P-type thin film transistor. The control electrode of the sixth pixel switching element T6 may be a gate electrode, the input electrode of the sixth pixel switching element T6 may be a source electrode and the output electrode of the sixth pixel switching element T6 may be a drain electrode.

The seventh pixel switching element T7 includes a control electrode to which the organic light emitting element initialization gate signal GB is applied, an input electrode to which the initialization voltage VI is applied and an output electrode connected to the anode electrode of the organic light emitting element OLED.

For example, the seventh pixel switching element T7 may be the oxide thin film transistor. For example, the seventh pixel switching element T7 may be the N-type thin film transistor. The control electrode of the seventh pixel switching element T7 may be a gate electrode, the input electrode of the seventh pixel switching element T7 may be a source electrode and the output electrode of the seventh pixel switching element T7 may be a drain electrode.

The storage capacitor CST includes a first electrode to which the high power voltage ELVDD is applied and a second electrode connected to the first node N1.

The organic light emitting element OLED includes the anode electrode and a cathode electrode to which a low power voltage ELVSS is applied.

In FIG. 3, during a first duration DU1, the first node N1 and the storage capacitor CST are initialized in response to the data initialization gate signal GI. During a second duration DU2, a threshold voltage |VTH| of the first pixel switching element T1 is compensated and the data voltage VDATA of which the threshold voltage |VTH| is compensated is written to the first node N1 in response to the first and second data write gate signals GWP and GWN. During a third duration DU3, the anode electrode of the organic light emitting element OLED is initialized in response to the organic light emitting element initialization gate signal GB. During a fourth duration DU4, the organic light emitting element OLED emit the light in response to the emission signal EM so that the display panel 100 displays the image.

Although an emission off duration of the emission signal EM corresponds to first to third durations DU1, DU2, and DU3 according to some example embodiments, embodiments of the present inventive concept is not limited thereto. The emission off duration of the emission signal EM may be set to include the data writing duration DU2. The emission off duration of the emission signal EM may be longer than a sum of the first to third durations DU1, DU2, and DU3.

During the first duration DU1, the data initialization gate signal GI may have an active level. For example, the active level of the data initialization gate signal GI may be a high level. When the data initialization gate signal GI has the active level, the fourth pixel switching element T4 is turned on so that the initialization voltage VI may be applied to the first node N1. The data initialization gate signal GI[N] of a present stage may be generated based on a scan signal SCAN[N−1] of a previous stage.

During the second duration DU2, the first data write gate signal GWP and the second data write gate signal GWN may have an active level. For example, the active level of the first data write gate signal GWP may be a low level and the active level of the second data write gate signal GWN may be a high level. When the first data write gate signal GWP and the second data writhe gate signal GWN have the active level, the second pixel switching element T2 and the third pixel switching element T3 are turned on. In addition, the first pixel switching element T1 is turned on in response to the initialization voltage VI. The first data write gate signal GWP[N] of the present stage may be generated based on a scan signal SCAN[N] of the present stage. The second data write gate signal GWN[N] of the present stage may be generated based on the scan signal SCAN[N] of the present stage.

A voltage which is subtraction an absolute value |VTH| of the threshold voltage of the first pixel switching element T1 from the data voltage VDATA may be charged at the first node N1 along a path generated by the first to third pixel switching elements T1, T2 and T3.

During the third duration DU3, the organic light emitting element initialization signal GB may have an active level. For example, the active level of the organic light emitting element initialization signal GB may be a high level. When the organic light emitting element initialization signal GB has the active level, the seventh pixel switching element T7 is turned on so that the initialization voltage VI may be applied to the anode electrode of the organic light emitting element OLED. The organic light emitting element initialization signal GB[N] of the present stage may be generated based on a scan signal SCAN[N+1] of a next stage.

During the fourth duration DU4, the emission signal EM may have an active level. The active level of the emission signal EM may be a low level. When the emission signal EM has the active level, the fifth pixel switching element T5 and the sixth pixel switching element T6 are turned on. In addition, the first pixel switching element T1 is turned on by the data voltage VDATA.

A driving current flows through the fifth pixel switching element T5, the first pixel switching element T1 and the sixth pixel switching element T6 to drive the organic light emitting element OLED. An intensity of the driving current may be determined by the level of the data voltage VDATA. A luminance of the organic light emitting element OLED is determined by the intensity of the driving current. The driving current ISD flowing through a path from the input electrode to the output electrode of the first pixel switching element T1 is determined according to the following Equation 1.

$$ISD = \frac{1}{2}\mu\text{Cox}\frac{W}{L}(VSG - |VTH|)^2 \quad \text{Equation 1}$$

In Equation 1, μ is a mobility of the first pixel switching element T1. Cox is a capacitance per unit area of the first pixel switching element T1. W/L is a width to length ratio of the first pixel switching element T1. VSG is a voltage between the input electrode N2 of the first pixel switching element T1 and the control node N1 of the first pixel switching element T1. |VTH| is the threshold voltage of the first pixel switching element T1.

The voltage VG of the first node N1 after the compensation of the threshold voltage |VTH| during the second duration DU2 may be represented according to the following Equation 2.

$$VG = VDATA - |VTH| \quad \text{Equation 2}$$

When the organic light emitting element OLED emits the light during the fourth duration DU4, the driving voltage VOV and the driving current ISD may be represented according to the following Equations 3 and 4. In Equation 3, VS is a voltage of the second node N2.

$$\begin{aligned} VOV &= VS - VG - |VTH| \\ &= ELVDD - (VDATA - |VTH|) - |VTH| \\ &= ELVDD - VDATA \end{aligned} \quad \text{Equation 3}$$

$$ISD = \frac{1}{2}\mu\text{Cox}\frac{W}{L}(ELVDD - VDATA)^2 \quad \text{Equation 4}$$

The threshold voltage |VTH| is compensated during the second duration DU2, so that the driving current ISD may be determined regardless of the threshold voltage |VTH| of the first pixel switching element T1 when the organic light emitting element OLED emits the light during the fourth duration DU4.

According to some example embodiments, when the image displayed on the display panel 100 is a static image or the display panel is operated in Always On Mode, a driving frequency of the display panel 100 may be decreased to reduce power consumption. When all of the switching elements of the pixel of the display panel 100 are polysilicon thin film transistor, a flicker may be generated due to a leakage current of the pixel switching element in the low frequency driving mode. Thus, some of the pixel switching elements may be designed using the oxide thin film transistors. According to some example embodiments, the third pixel switching element T3, the fourth pixel switching element T4 and the seventh pixel switching element T7 may be the oxide thin film transistors. The first pixel switching element T1, the second pixel switching element T2, the fifth pixel switching element T5 and the sixth pixel switching element T6 may be the polysilicon thin film transistors.

Figure 4:
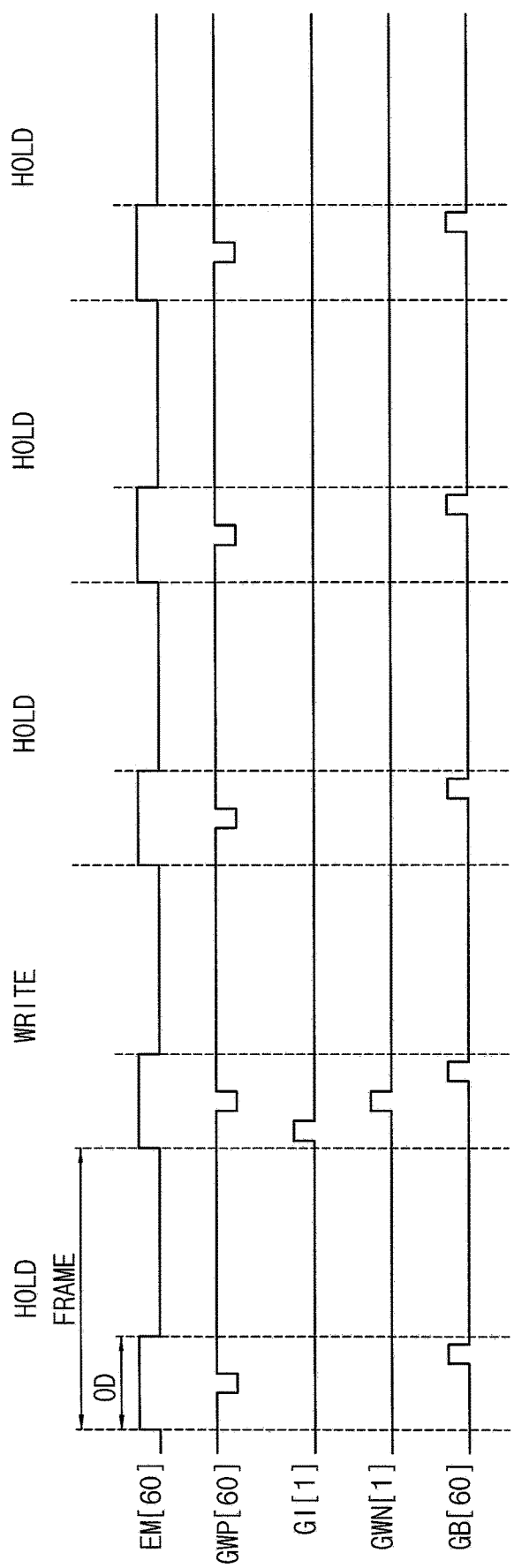
FIG. 4 is a timing diagram illustrating input signals applied to the pixels of the display panel of FIG. 2 in a low frequency driving mode.

FIG. 4 is a timing diagram illustrating input signals applied to the pixels of the display panel of FIG. 2 in a low frequency driving mode.

Referring to FIGS. 1 to 4, the display panel 100 may be driven in a normal driving mode in which the display panel 100 is driven in a normal driving frequency and in a low frequency driving mode in which the display panel 100 is driven in a frequency less than the normal driving frequency.

For example, when the input image data represent a video image, the display panel 100 may be driven in the normal driving mode. For example, when the input image data represent a static image, the display panel may be driven in the low frequency driving mode. For example, when the display apparatus is operated in the always on mode, the display panel may be driven in the low frequency driving mode.

The display panel 100 may be driven in a unit of frame. The display panel 100 may be refreshed in every frame in the normal driving mode. Thus, the normal driving mode includes only writing frames in which the data is written in the pixel.

The display panel 100 may be refreshed in the frequency of the low frequency driving mode in the low frequency driving mode. Thus, the low frequency driving mode includes the writing frames in which the data is written in the pixel and holding frames in which the written data is maintained without writing the data in the pixel.

For example, when the frequency of the normal driving mode is 60 Hz and the frequency of the low frequency driving mode is 1 Hz, the low frequency driving mode includes one writing frame WRITE and fifty nine holding frames HOLD in a second. For example, when the frequency of the normal driving mode is 60 Hz and the frequency of the low frequency driving mode is 1 Hz, fifty nine continuous holding frames HOLD are located between two adjacent writing frames WRITE.

For example, when the frequency of the normal driving mode is 60 Hz and the frequency of the low frequency driving mode is 10 Hz, the low frequency driving mode includes ten writing frame WRITE and fifty holding frames HOLD in a second. For example, when the frequency of the normal driving mode is 60 Hz and the frequency of the low frequency driving mode is 10 Hz, five continuous holding frames HOLD are located between two adjacent writing frames WRITE.

According to some example embodiments, the second data write gate signal GWN and the data initialization gate signal GI may have a first frequency in the low frequency driving mode. The first frequency may be the frequency of the low frequency driving mode. In contrast, the first data write gate signal GWP, the emission signal EM and the organic light emitting element initialization gate signal GB may have a second frequency greater than the first frequency. The second frequency may be the normal frequency of the normal driving mode. In FIG. 4, the first frequency is 1 Hz and the second frequency is 60 Hz.

The emission signal EM in the frame may include an emission off duration OD when the emission signal EM has the inactive level and an emission on duration when the emission signal EM has the active level.

Figure 5:
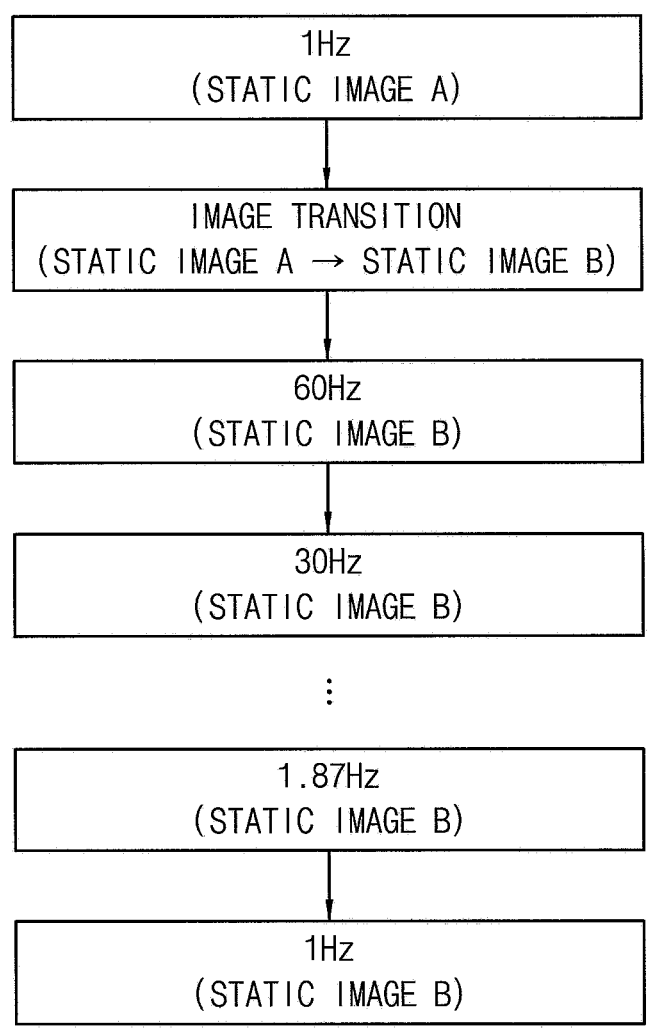
FIG. 5 is a flowchart diagram illustrating a method of driving the display panel of FIG. 1 when a low driving frequency is 1 Hz.
Figure 6:
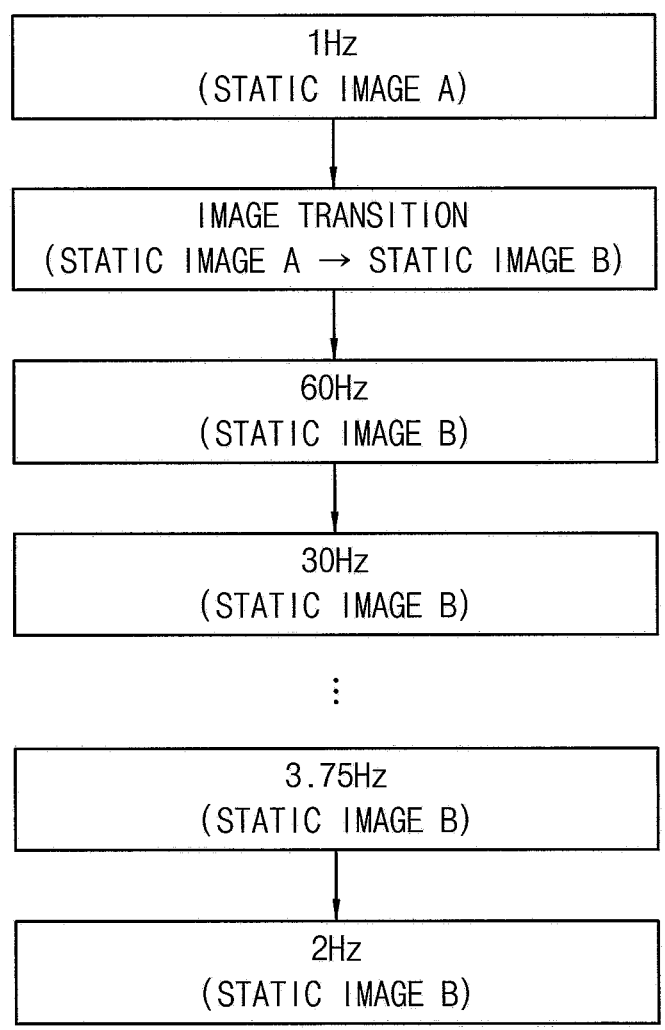
FIG. 6 is a flowchart diagram illustrating a method of driving the display panel of FIG. 1 when a low driving frequency is 2 Hz.

FIG. 5 is a flowchart diagram illustrating a method of driving the display panel 100 of FIG. 1 when a low driving frequency is 1 Hz. FIG. 6 is a flowchart diagram illustrating a method of driving the display panel 100 of FIG. 1 when a low driving frequency is 2 Hz.

Referring to FIGS. 1 to 6, the driving controller 200 may determine the low driving frequency corresponding to the input image data IMG in the low frequency driving mode. The low driving frequency may be determined based on a degree of the flicker.

For example, when the flicker does not occur in the driving frequency of 1 Hz, the low driving frequency may be determined to be 1 Hz.

For example, when the flicker occurs in the driving frequency of 1 Hz and the flicker does not occur in the driving frequency of 2 Hz, the low driving frequency may be determined to be 2 Hz.

The driving controller 200 may determine a plurality of compensation frequencies greater than the low driving frequency. The driving controller 200 inserts a plurality of compensation frequency frames having the compensation frequencies prior to a low driving frequency frame having the low driving frequency.

In the low frequency driving mode, the switching element of the second type may be driven in the low driving frequency. In contrast, the switching element of the first type may be driven in a first driving frequency greater than the low driving frequency. The first driving frequency may be the normal driving frequency of the normal driving mode.

In the normal driving mode, both of the switching element of the first type and the switching element of the second type may be driven in the normal driving frequency.

For example, when the image transition of the input image data IMG is occurs from a first static image (Static Image A) to a second static image (Static Image B) different from the first static image (Static Image A), the driving controller 200 may insert the compensation frequency frames.

In FIG. 5, the low driving frequency corresponding to the first static image (Static Image A) may be 1 Hz and the low driving frequency corresponding to the second static image (Static Image B) may be 1 Hz.

For example, a first compensation frequency to compensate the flicker may be the normal driving frequency (e.g. 60 Hz). The normal driving frequency may mean an input frequency of the input image data IMG. Right after the image transition occurs from the first static image to the second static image different from the first static image, the display panel 100 may be driven in the first compensation frequency (e.g., 60 Hz).

A second compensation frequency (e.g., 30 Hz) to compensate the flicker may be less than the first compensation frequency (e.g., 60 Hz) and greater than the low driving frequency (e.g., 1 Hz) of the second static image. After the image transition occurs from the first static image to the second static image and the display panel 100 is driven in the first compensation frequency (e.g., 60 Hz), the display panel 100 may be driven in the second compensation frequency (e.g., 30 Hz).

The compensation frequencies after the second compensation frequency may be generated in a predetermined rule. When the compensation frequency generated in the predetermined rule is less than the low driving frequency (e.g., 1 Hz), the compensation frequency may not be generated. In FIG. 5, compensation frequencies may be generated by dividing previous compensation frequencies by two. After the display panel 100 is driven in the compensation frequency of 1.875 Hz, a subsequent candidate compensation frequency may be determined to be 0.9375 Hz. 0.9375 Hz is less than the low driving frequency (e.g., 1 Hz), so that 0.9375 Hz is not decided as the compensation frequency.

In FIG. 6, the low driving frequency corresponding to the first static image (Static Image A) may be 1 Hz and the low driving frequency corresponding to the second static image (Static Image B) may be 2 Hz.

For example, a first compensation frequency to compensate the flicker may be the normal driving frequency (e.g., 60 Hz). The normal driving frequency may mean an input frequency of the input image data IMG. Right after the image transition occurs from the first static image to the second static image different from the first static image, the display panel 100 may be driven in the first compensation frequency (e.g. 60 Hz).

A second compensation frequency (e.g., 30 Hz) to compensate the flicker may be less than the first compensation frequency (e.g., 60 Hz) and greater than the low driving frequency (e.g., 2 Hz) of the second static image. After the image transition occurs from the first static image to the second static image and the display panel 100 is driven in the first compensation frequency (e.g., 60 Hz), the display panel 100 may be driven in the second compensation frequency (e.g., 30 Hz).

The compensation frequencies after the second compensation frequency may be generated according to a predetermined rule. When the compensation frequency generated in the predetermined rule is less than the low driving frequency (e.g., 1 Hz), the compensation frequency may not be generated. In FIG. 6, compensation frequencies may be generated by dividing previous compensation frequencies by two. After the display panel 100 is driven in the compensation frequency of 3.75 Hz, a subsequent candidate compensation frequency may be determined to be 1.875 Hz. 1.875 Hz is less than the low driving frequency (e.g., 2 Hz), so that 1.875 Hz is not decided as the compensation frequency.

Figure 8A:
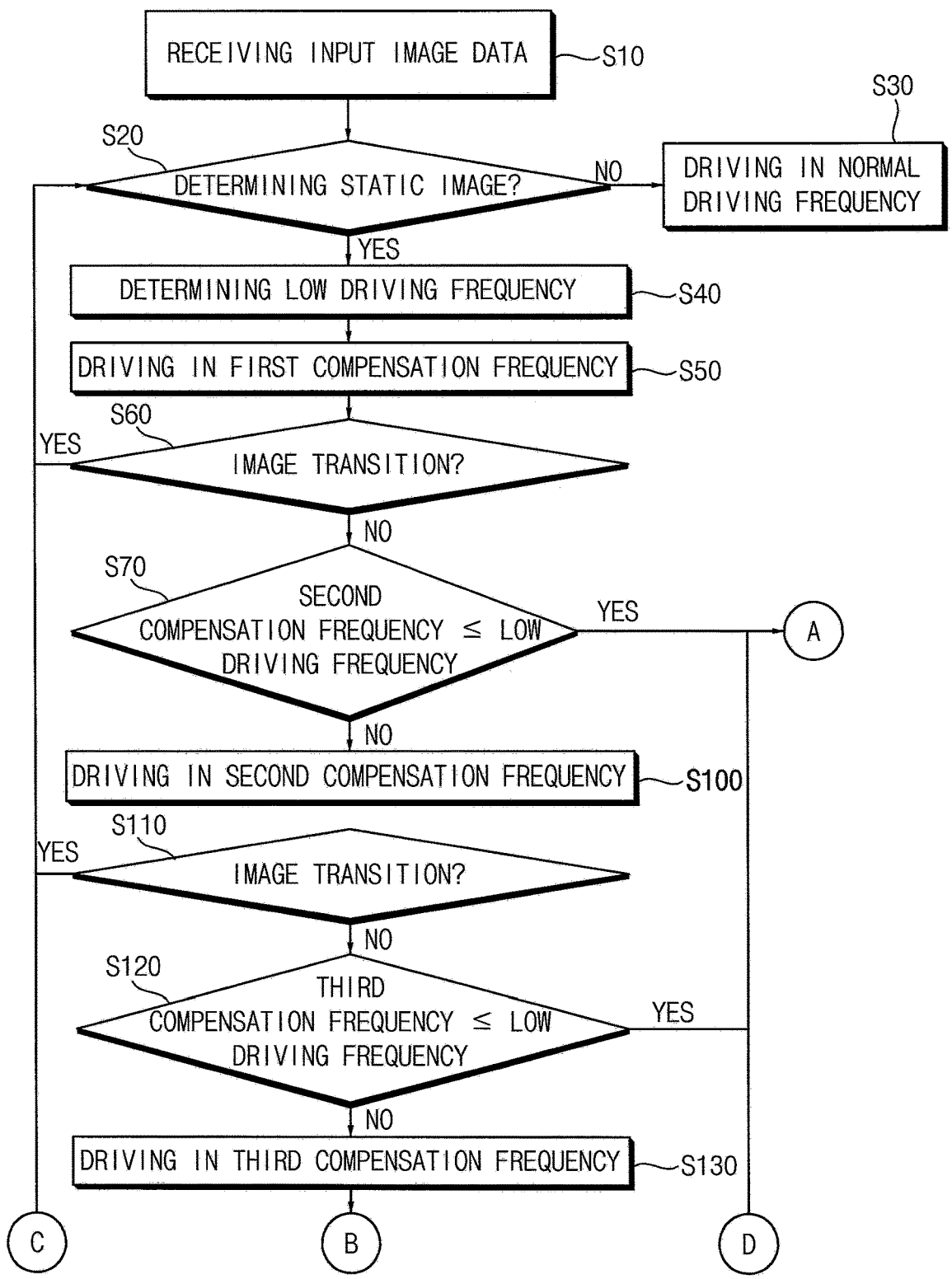
FIGS. 8A and 8B are flowchart diagrams illustrating a method of driving the display panel of FIG. 1.
Figure 8B:
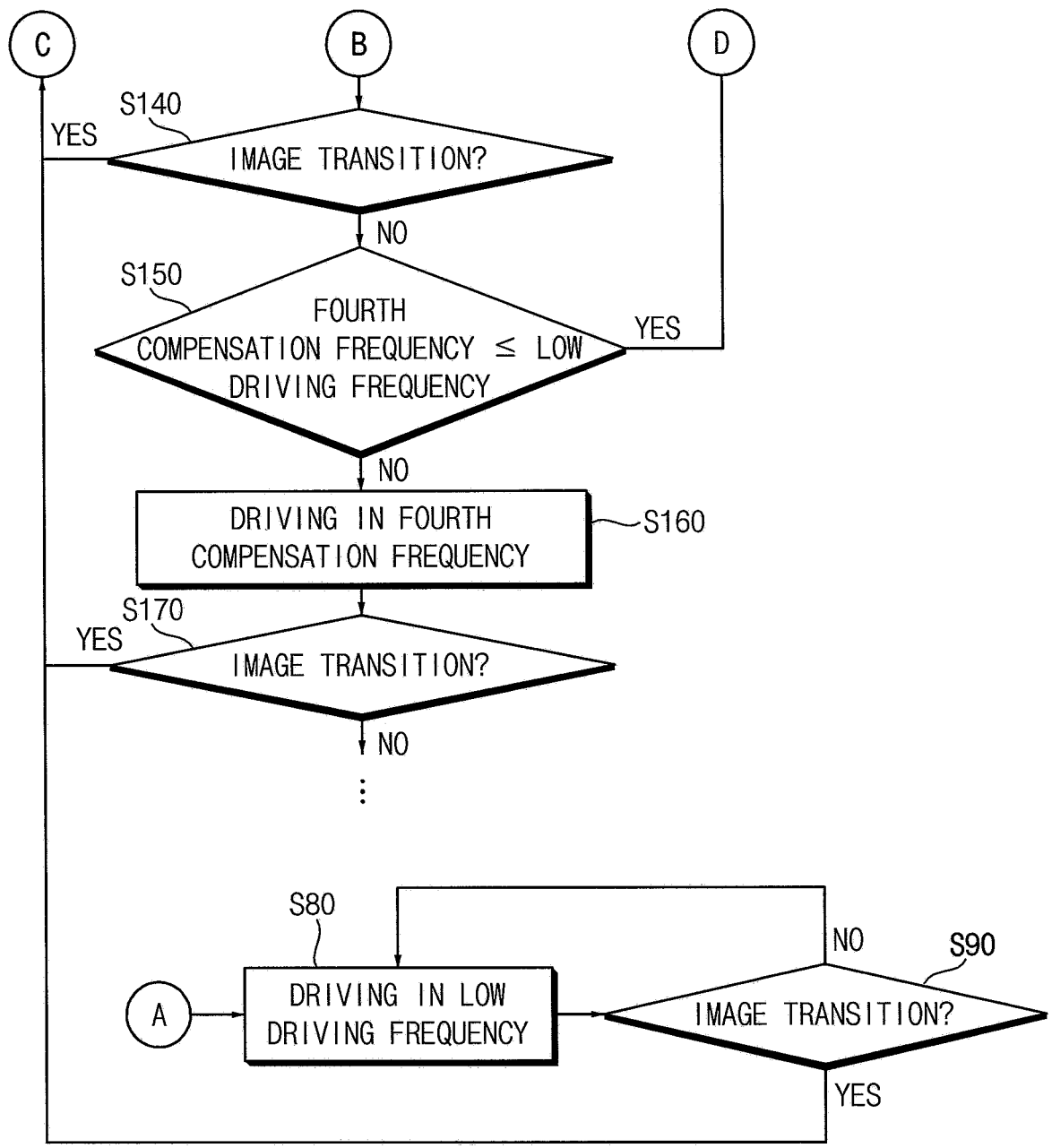
Figure 9:
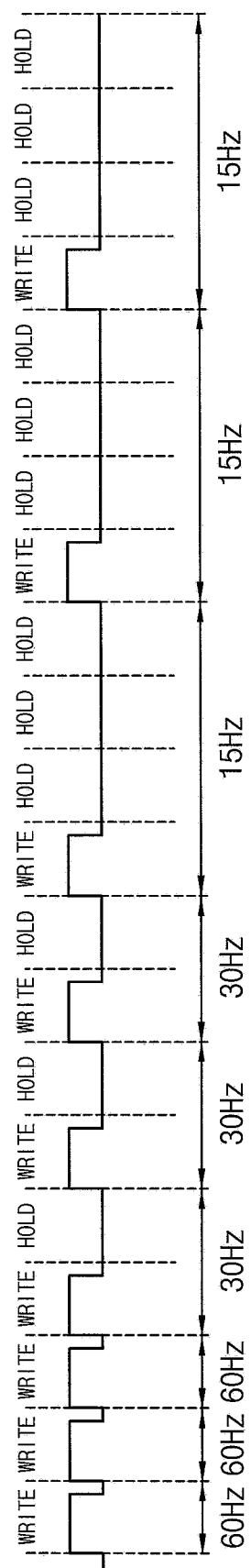
FIG. 9 is a timing diagram illustrating compensation frequency frames of the display panel of FIG. 1.

FIG. 7 is a table illustrating compensation frequencies for driving the display panel 100 of FIG. 1. FIGS. 8A and 8B are flowchart diagrams illustrating a method of driving the display panel 100 of FIG. 1. FIG. 9 is a timing diagram illustrating the compensation frequency frames of the display panel 100 of FIG. 1.

Referring to FIGS. 1 to 9, the driving controller 200 may generate the compensation frequencies by repetitively dividing the normal driving frequency of the normal driving mode by a parameter.

In FIG. 7, the normal driving frequency may be 60 Hz and the parameter may be two. The first compensation frequency may be the normal driving frequency. The second compensation frequency may be 30 Hz which is generated by dividing the normal driving frequency by two. The second compensation frequency (30 Hz) may be generated by inserting a holding frame between two adjacent writing frames of the normal driving frequency (60 Hz). The third compensation frequency may be 15 Hz which is generated by dividing the second compensation frequency by two. The third compensation frequency (15 Hz) may be generated by inserting three holding frames between two adjacent writing frames of the normal driving frequency (60 Hz). The fourth compensation frequency may be 7.5 Hz which is generated by dividing the third compensation frequency by two. The fourth compensation frequency (7.5 Hz) may be generated by inserting seven holding frames between two adjacent writing frames of the normal driving frequency (60 Hz). The fifth compensation frequency may be 3.75 Hz which is generated by dividing the fourth compensation frequency by two. The fifth compensation frequency (3.75 Hz) may be generated by inserting fifteen holding frames between two adjacent writing frames of the normal driving frequency (60 Hz). The sixth compensation frequency may be 1.875 Hz which is generated by dividing the fifth compensation frequency by two. The sixth compensation frequency (1.875 Hz) may be generated by inserting thirty one holding frames between two adjacent writing frames of the normal driving frequency (60 Hz). When the low driving frequency is 1 Hz, 0.9375 Hz which is determined by dividing the sixth compensation frequency by two is less than the low driving frequency of 1 Hz so that 0.9375 Hz is not decided as the compensation frequency.

Referring to FIGS. 8A and 8B, the driving controller 200 receives the input image data IMG (operation S10). The driving controller 200 determines whether the input image data IMG represents the static image or the video image (operation S20).

When the input image data IMG represents the video image, the driving controller 200 may drive the display panel 100 in the normal driving frequency (operation S30).

When the input image data IMG represents the static image, the driving controller 200 determines the low driving frequency corresponding to the input image data IMG (operation S40). The low driving frequency may be the minimum frequency in which the flicker does not occur when the static image is displayed. The low driving frequency may be varied according to the input image data IMG. For example, the low driving frequency may be determined based on difference between luminance of previous image data and luminance of present image data. For example, the low driving frequency may be determined based on the number of pixels where the grayscale value is changed from the previous image data to the present image data.

After the low driving frequency is determined, the driving controller 200 drives the display panel 100 in the first driving frequency (operation S50). The first driving frequency may be the normal driving frequency. The normal driving frequency may be the input frequency of the input image data IMG. For example, the plurality of the first compensation frequency frames (e.g., three in FIG. 9) having the first compensation frequency may be inserted in the operation S50.

When the display panel 100 is driven in the first compensation frequency and the image transition of the input image data IMG occurs (operation S60), the driving controller 200 may determine whether the transited input image data IMG represents the static image or the video image (operation S20).

When the display panel 100 is driven in the first compensation frequency and the image transition of the input image data IMG does not occur, the driving controller 200 may generate the second compensation frequency by dividing the first compensation frequency into the parameter.

The driving controller 200 determines whether the second compensation frequency is equal to or less than the low driving frequency or not (operation S70). When the second compensation frequency is equal to or less than the low driving frequency, the display panel is not driven in the second compensation frequency but driven in the low driving frequency (operation S80). When the display panel 100 is driven in the low driving frequency and the image transition of the input image data IMG occurs (operation S90), the driving controller 200 may determine whether the transited input image data IMG represents the static image or the video image (operation S20). When the display panel 100 is driven in the low driving frequency and the image transition of the input image data IMG does not occur, the display panel 100 may be driven in the low driving frequency.

When the second compensation frequency is greater than the low driving frequency, the driving controller 200 drives the display panel 100 in the second compensation frequency (operation S100). For example, the plurality of the second compensation frequency frames (e.g. three in FIG. 9) having the second compensation frequency may be inserted in the operation S100.

When the display panel 100 is driven in the second compensation frequency and the image transition of the input image data IMG occurs (operation S110), the driving controller 200 may determine whether the transited input image data IMG represents the static image or the video image (operation S20).

When the display panel 100 is driven in the second compensation frequency and the image transition of the input image data IMG does not occur, the driving controller 200 may generate the third compensation frequency by dividing the second compensation frequency into the parameter.

The driving controller 200 determines whether the third compensation frequency is equal to or less than the low driving frequency or not (operation S120). When the third compensation frequency is equal to or less than the low driving frequency, the display panel is not driven in the third compensation frequency but driven in the low driving frequency (operation S80). When the display panel 100 is driven in the low driving frequency and the image transition of the input image data IMG occurs (operation S90), the driving controller 200 may determine whether the transited input image data IMG represents the static image or the video image (operation S20). When the display panel 100 is driven in the low driving frequency and the image transition of the input image data IMG does not occur, the display panel 100 may be driven in the low driving frequency.

When the third compensation frequency is greater than the low driving frequency, the driving controller 200 drives the display panel 100 in the third compensation frequency (operation S130). For example, the plurality of the third compensation frequency frames (e.g. three in FIG. 9) having the third compensation frequency may be inserted in the operation S130.

When the display panel 100 is driven in the third compensation frequency and the image transition of the input image data IMG occurs (operation S140), the driving controller 200 may determine whether the transited input image data IMG represents the static image or the video image (operation S20).

When the display panel 100 is driven in the third compensation frequency and the image transition of the input image data IMG does not occur, the driving controller 200 may generate the fourth compensation frequency by dividing the third compensation frequency into the parameter.

The driving controller operates operations S150 to S170 in a way same as the operations S120 to S140. Until the compensation frequency generated by dividing the previous compensation frequency by the parameter is equal to or less than the low driving frequency, the display panel 100 is repetitively driven in the compensation frequency.

According to some example embodiments, the plurality of the compensation frequency frames having each of the compensation frequencies may be inserted. For example, the plurality of first compensation frequency frame having the first compensation frequency may be inserted and the plurality of second compensation frequency frame having the second compensation frequency may be inserted.

In FIG. 9, three first compensation frequency frames having the first compensation frequency (e.g., 60 Hz) are inserted, three second compensation frequency frames having the second compensation frequency (e.g., 30 Hz) are inserted and three third compensation frequency frames having the third compensation frequency (e.g., 15 Hz) are inserted. Although the number of the first compensation frequency frames, the number of the second compensation frequency frames and the number of the third compensation frequency frames are same as each other in FIG. 9, the present inventive concept is not limited thereto. Alternatively, the number of the first compensation frequency frames may be greater than the number of the second compensation frequency frames and the number of the second compensation frequency frames may be greater than the number of the third compensation frequency frames. The number of the compensation frequency frames may be properly adjusted to effectively prevent the flicker.

According to some example embodiments, the plurality of the compensation frequency frames may be inserted prior to the low driving frequency frame in the low frequency driving mode so that the afterimage of the previous image or the flicker due to the hysteresis characteristics of the pixel switching elements may be prevented.

The flicker of the display panel 100 is prevented in the low frequency driving mode so that the power consumption of the display apparatus may be reduced and the display quality of the display panel 100 may be enhanced.

Figure 11:
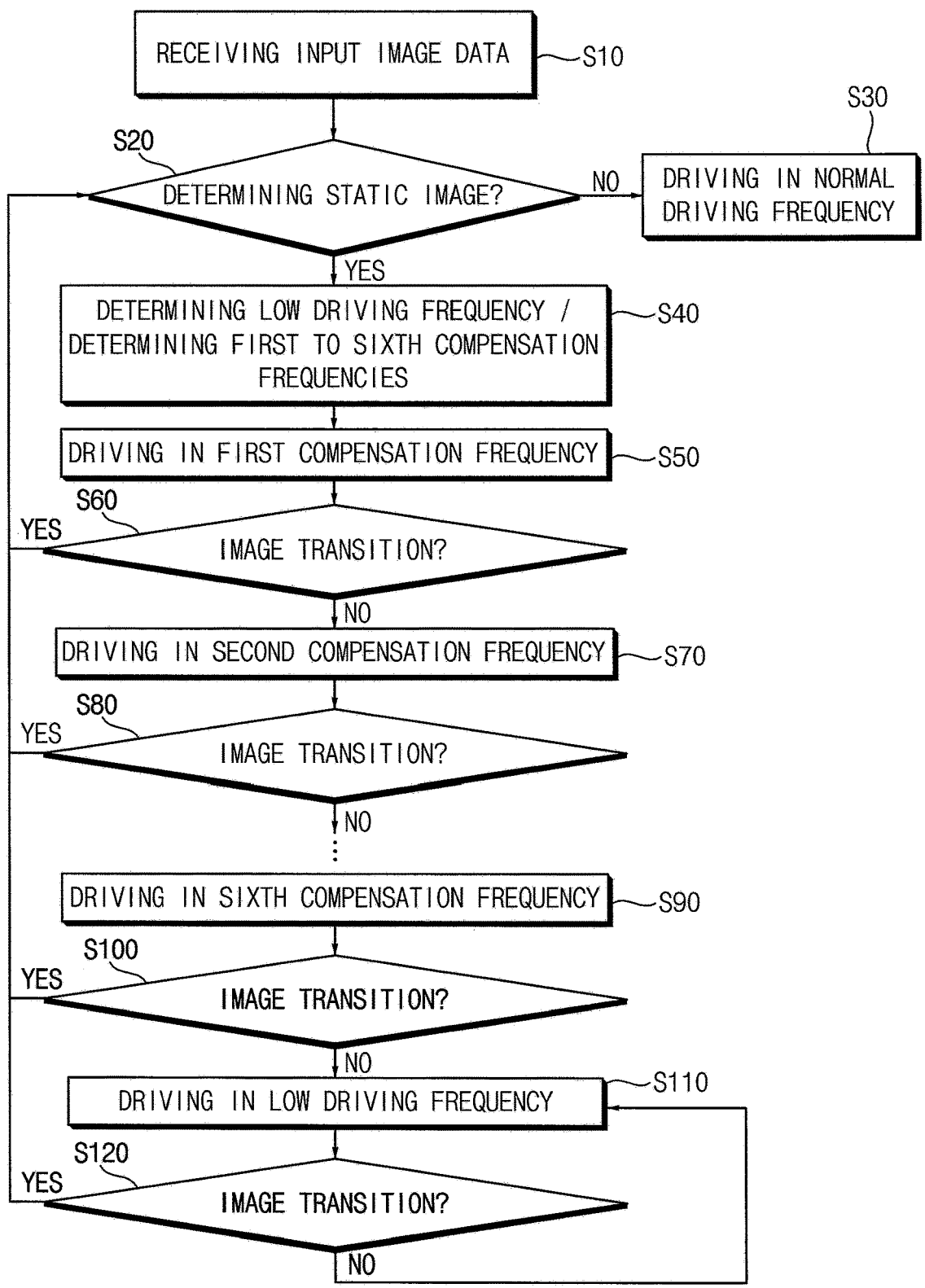
FIG. 11 is a flowchart diagram illustrating a method of driving the display panel of FIG. 10.

FIG. 10 is a table illustrating compensation frequencies for driving a display panel according to some example embodiments of the present inventive concept. FIG. 11 is a flowchart diagram illustrating a method of driving the display panel of FIG. 10.

The display apparatus and the method of driving the display panel according to some example embodiments is substantially the same as the display apparatus and the method of driving the display panel of the previous example embodiments explained referring to FIGS. 1 to 9 except for the method of determining the compensation frequency. Thus, the same reference numerals will be used to refer to the same or like parts as those described in the previous example embodiments of FIGS. 1 to 9 and some repetitive explanation concerning the above elements may be omitted.

Referring to FIGS. 1 to 4 and 9 to 11, the display apparatus includes a display panel 100 and a display panel driver. The display panel driver includes a driving controller 200, a gate driver 300, a gamma reference voltage generator 400, a data driver 500 and an emission driver 600.

The display panel 100 includes a plurality of the pixels. Each pixel includes an organic light emitting element OLED.

The pixel receives a data write gate signal GWP and GWN, a data initialization gate signal GI, an organic light emitting element initialization signal GB, the data voltage VDATA and the emission signal EM and the organic light emitting element OLED of the pixel emits light corresponding to the level of the data voltage VDATA to display the image.

The display panel 100 may be driven in a normal driving mode in which the display panel 100 is driven in a normal driving frequency and in a low frequency driving mode in which the display panel 100 is driven in a frequency less than the normal driving frequency.

The driving controller 200 may determine the low driving frequency corresponding to the input image data IMG in the low frequency driving mode. The driving controller 200 may determine a plurality of compensation frequencies greater than the low driving frequency. The driving controller 200 inserts a plurality of compensation frequency frames having the compensation frequencies prior to a low driving frequency frame having the low driving frequency.

The driving controller 200 may generate the compensation frequencies by repetitively multiplying a parameter to the low driving frequency.

In FIG. 9, the normal driving frequency may be 60 Hz, the low driving frequency may be 1 Hz and the parameter may be two. The sixth compensation frequency may be 2 Hz which is generated by multiplying two to the low driving frequency. The sixth compensation frequency (2 Hz) may be generated by inserting twenty nine holding frames between two adjacent writing frames of the normal driving frequency (60 Hz). The fifth compensation frequency may be 4 Hz which is generated by multiplying two to the sixth driving frequency. The fifth compensation frequency (4 Hz) may be generated by inserting fourteen holding frames between two adjacent writing frames of the normal driving frequency (60 Hz). The fourth compensation frequency may be 7.5 Hz approximate to 8 Hz which is generated by multiplying two to the fifth driving frequency. 8 Hz cannot be obtained by inserting an integer number of holding frames between two adjacent writing frames of the normal driving frequency (60 Hz) so that the fourth compensation frequency may be 7.5 Hz approximate to 8 Hz. The fourth compensation frequency (7.5 Hz) may be generated by inserting seven holding frames between two adjacent writing frames of the normal driving frequency (60 Hz). The third compensation frequency may be 15 Hz which is generated by multiplying two to the fourth driving frequency. The third compensation frequency (15 Hz) may be generated by inserting three holding frames between two adjacent writing frames of the normal driving frequency (60 Hz). The second compensation frequency may be 30 Hz which is generated by multiplying two to the third driving frequency. The second compensation frequency (30 Hz) may be generated by inserting a holding frame between two adjacent writing frames of the normal driving frequency (60 Hz). The first compensation frequency may be 60 Hz which is generated by multiplying two to the second driving frequency. The first compensation frequency (60 Hz) may be the normal driving frequency (60 Hz). A subsequent candidate compensation frequency may be 120 Hz which is generated by multiplying two to the first driving frequency is greater than the normal driving frequency so that 120 Hz is not decided as the compensation frequency.

Referring to FIG. 11, the driving controller 200 receives the input image data IMG (operation S10). The driving controller 200 determines whether the input image data IMG represents the static image or the video image (operation S20).

When the input image data IMG represents the video image, the driving controller 200 may drive the display panel 100 in the normal driving frequency (operation S30).

When the input image data IMG represents the static image, the driving controller 200 determines the low driving frequency corresponding to the input image data IMG and generates the compensation frequency by multiplying the parameter to the low driving frequency (operation S40). The driving controller 200 may repetitively generate the compensation frequencies which are less than the normal driving frequency by multiplying the parameter to the low driving frequency.

After the low driving frequency and the compensation frequencies are determined, the driving controller 200 drives the display panel 100 in a first compensation frequency (operation S50).

When the display panel 100 is driven in the first compensation frequency and the image transition of the input image data IMG occurs (operation S60), the driving controller 200 may determine whether the transited input image data IMG represents the static image or the video image (operation S20).

When the display panel 100 is driven in the first compensation frequency and the image transition of the input image data IMG does not occur, the driving controller 200 drives the display panel 100 in a second compensation frequency (operation S70).

When the display panel 100 is driven in the second compensation frequency and the image transition of the input image data IMG occurs (operation S80), the driving controller 200 may determine whether the transited input image data IMG represents the static image or the video image (operation S20).

When the display panel 100 is driven in the second compensation frequency and the image transition of the input image data IMG does not occur, the driving controller 200 drives the display panel 100 in a third compensation frequency.

When the display panel 100 is driven in the third compensation frequency and the image transition of the input image data IMG occurs, the driving controller 200 may determine whether the transited input image data IMG represents the static image or the video image (operation S20).

The driving controller 200 repetitively operate the compensation frequency driving in a way same as operations S70 and S80. In the same way, the driving controller 200 may drive the display panel 100 in the sixth compensation frame.

When the display panel 100 is driven in the sixth compensation frequency and the image transition of the input image data IMG occurs (operation S100), the driving controller 200 may determine whether the transited input image data IMG represents the static image or the video image (operation S20).

When the display panel 100 is driven in the sixth compensation frequency and the image transition of the input image data IMG does not occur, the driving controller 200 drives the display panel 100 in the low driving frequency (operation S110).

When the display panel 100 is driven in the low driving frequency and the image transition of the input image data IMG occurs (operation S120), the driving controller 200 may determine whether the transited input image data IMG represents the static image or the video image (operation S20). When the display panel 100 is driven in the low driving frequency and the image transition of the input image data IMG does not occur, the display panel 100 is driven in the low driving frequency According to some example embodiments, the plurality of the compensation frequency frames may be inserted prior to the low driving frequency frame in the low frequency driving mode so that instances of an afterimage of the previous image or the flicker due to the hysteresis characteristics of the pixel switching elements may be prevented or reduced.

The flicker of the display panel 100 is prevented or reduced in the low frequency driving mode so that the power consumption of the display apparatus may be reduced and the display quality of the display panel 100 may be enhanced.

Figure 12:
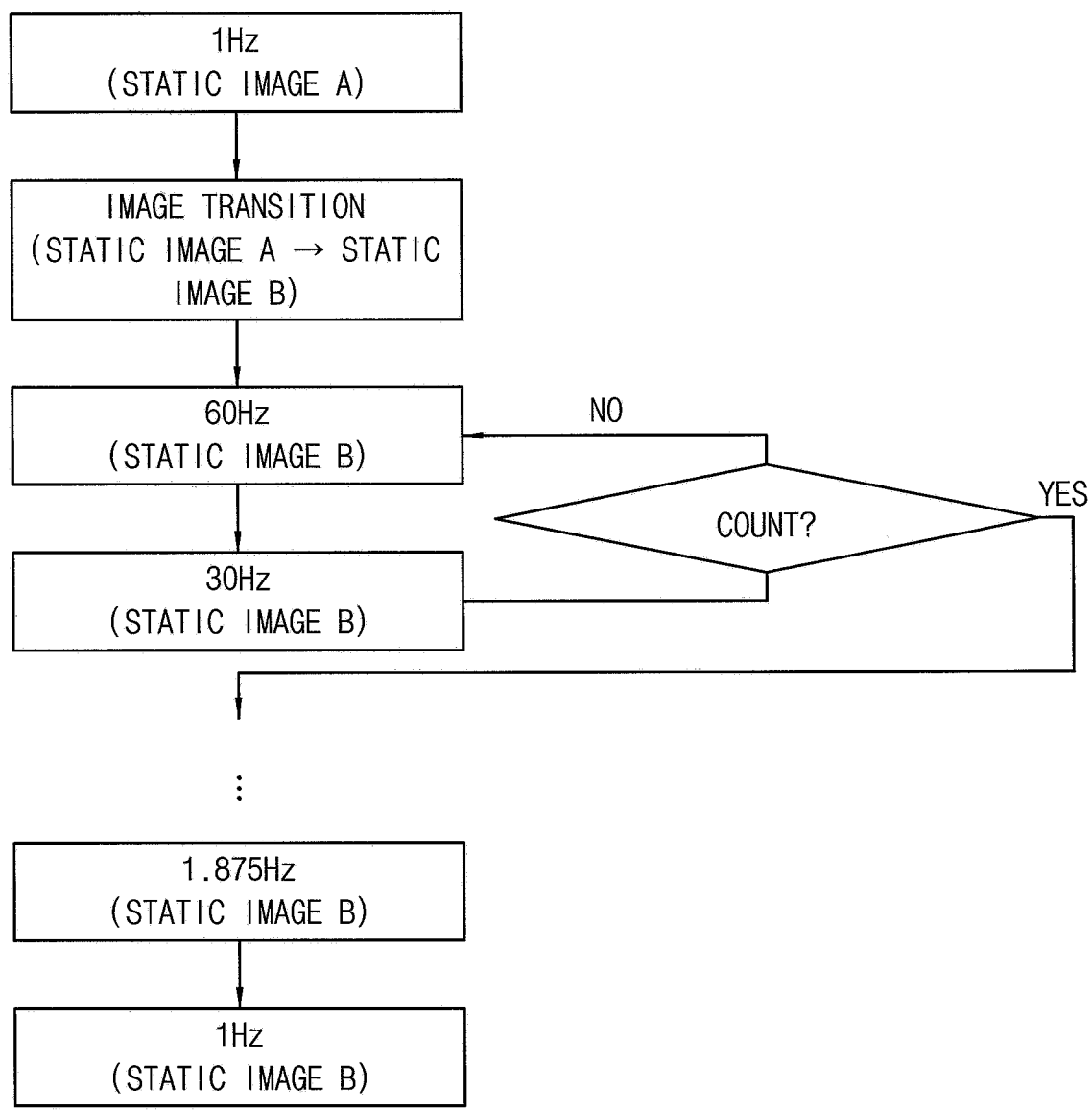
FIG. 12 is a flowchart diagram illustrating a method of driving a display panel according to some example embodiments of the present inventive concept when a low driving frequency is 1 Hz.

FIG. 12 is a flowchart diagram illustrating a method of driving a display panel 100 according to some example embodiments of the present inventive concept when a low driving frequency is 1 Hz.

The display apparatus and the method of driving the display panel according to some example embodiments is substantially the same as the display apparatus and the method of driving the display panel of the previous example embodiments explained referring to FIGS. 1 to 9 except for the method of determining the compensation frequency.

Thus, the same reference numerals will be used to refer to the same or like parts as those described in the previous example embodiments of FIGS. 1 to 9 and some repetitive explanation concerning the above elements may be omitted.

Referring to FIGS. 1 to 4 and 12, the display apparatus includes a display panel 100 and a display panel driver. The display panel driver includes a driving controller 200, a gate driver 300, a gamma reference voltage generator 400, a data driver 500 and an emission driver 600.

The display panel 100 includes a plurality of the pixels. Each pixel includes an organic light emitting element OLED.

The pixel receives a data write gate signal GWP and GWN, a data initialization gate signal GI, an organic light emitting element initialization signal GB, the data voltage VDATA and the emission signal EM and the organic light emitting element OLED of the pixel emits light corresponding to the level of the data voltage VDATA to display the image.

The display panel 100 may be driven in a normal driving mode in which the display panel 100 is driven in a normal driving frequency and in a low frequency driving mode in which the display panel 100 is driven in a frequency less than the normal driving frequency.

The driving controller 200 may determine the low driving frequency corresponding to the input image data IMG in the low frequency driving mode. The driving controller 200 may determine a plurality of compensation frequencies greater than the low driving frequency. The driving controller 200 inserts a plurality of compensation frequency frames having the compensation frequencies prior to a low driving frequency frame having the low driving frequency.

According to some example embodiments, the compensation frequency frames having at least two compensation frequencies may be repetitively inserted until a predetermined count is satisfied.

For example, when the repetitive compensation frequency frames are a compensation frequency frame of 60 Hz and a compensation frequency frame of 30 Hz and the predetermined count is three, the compensation frequency frames may be inserted in a sequence of 60 Hz, 30 Hz, 60 Hz, 30 Hz, 60 Hz, 30 Hz, 15 Hz, 7.5 Hz, 3.75 Hz and 1.875 Hz.

The repetitive compensation frequency frames and the predetermined count may be set to prevent the flicker of the display panel 100. The repetitive compensation frequency frames and the predetermined count may be adjusted according to the input image data IMG.

According to some example embodiments, the plurality of the compensation frequency frames may be inserted prior to the low driving frequency frame in the low frequency driving mode so that the afterimage of the previous image or the flicker due to the hysteresis characteristics of the pixel switching elements may be prevented.

The flicker of the display panel 100 is prevented in the low frequency driving mode so that the power consumption of the display apparatus may be reduced and the display quality of the display panel 100 may be enhanced.

Figure 13:
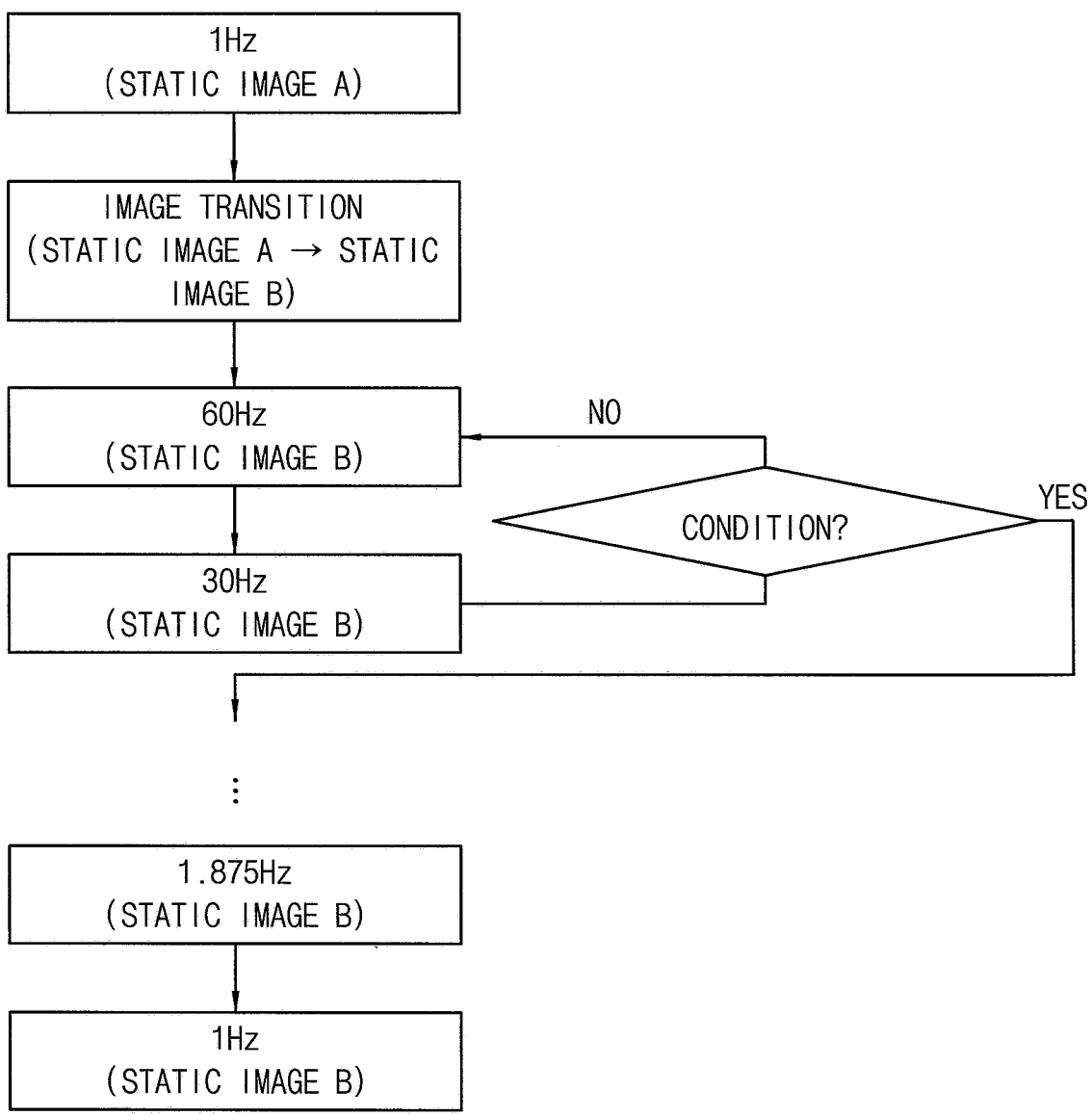
FIG. 13 is a flowchart diagram illustrating a method of driving a display panel according to some example embodiments of the present inventive concept when a low driving frequency is 1 Hz.

FIG. 13 is a flowchart diagram illustrating a method of driving a display panel 100 according to some example embodiments of the present inventive concept when a low driving frequency is 1 Hz.

The display apparatus and the method of driving the display panel according to the present example embodiment is substantially the same as the display apparatus and the method of driving the display panel of the previous example embodiments explained referring to FIGS. 1 to 9 except for the method of determining the compensation frequency.

Thus, the same reference numerals will be used to refer to the same or like parts as those described in the previous example embodiment of FIGS. 1 to 9 and some repetitive explanation concerning the above elements may be omitted.

Referring to FIGS. 1 to 4 and 13, the display apparatus includes a display panel 100 and a display panel driver. The display panel driver includes a driving controller 200, a gate driver 300, a gamma reference voltage generator 400, a data driver 500 and an emission driver 600.

The display panel 100 includes a plurality of the pixels. Each pixel includes an organic light emitting element OLED.

The pixel receives a data write gate signal GWP and GWN, a data initialization gate signal GI, an organic light emitting element initialization signal GB, the data voltage VDATA and the emission signal EM and the organic light emitting element OLED of the pixel emits light corresponding to the level of the data voltage VDATA to display the image.

The display panel 100 may be driven in a normal driving mode in which the display panel 100 is driven in a normal driving frequency and in a low frequency driving mode in which the display panel 100 is driven in a frequency less than the normal driving frequency.

The driving controller 200 may determine the low driving frequency corresponding to the input image data IMG in the low frequency driving mode. The driving controller 200 may determine a plurality of compensation frequencies greater than the low driving frequency. The driving controller 200 inserts a plurality of compensation frequency frames having the compensation frequencies prior to a low driving frequency frame having the low driving frequency.

According to some example embodiments, the compensation frequency frames having at least two compensation frequencies may be repetitively inserted until a condition (e.g., a predetermined condition) is satisfied.

For example, when the repetitive compensation frequency frames are a compensation frequency frame of 60 Hz and a compensation frequency frame of 30 Hz and the condition (e.g., the predetermined condition) is satisfied in two repetition, the compensation frequency frames may be inserted in a sequence of 60 Hz, 30 Hz, 60 Hz, 30 Hz, 15 Hz, 7.5 Hz, 3.75 Hz and 1.875 Hz.

The repetitive compensation frequency frames and the condition (e.g., the predetermined condition) may be set to prevent the flicker of the display panel 100. The repetitive compensation frequency frames and the condition (e.g., the predetermined condition) may be adjusted according to the input image data IMG.

According to some example embodiments, the plurality of the compensation frequency frames may be inserted prior to the low driving frequency frame in the low frequency driving mode so that the afterimage of the previous image or the flicker due to the hysteresis characteristics of the pixel switching elements may be prevented.

The flicker of the display panel 100 is prevented or reduced in the low frequency driving mode so that the power consumption of the display apparatus may be reduced and the display quality of the display panel 100 may be enhanced.

Figure 14:
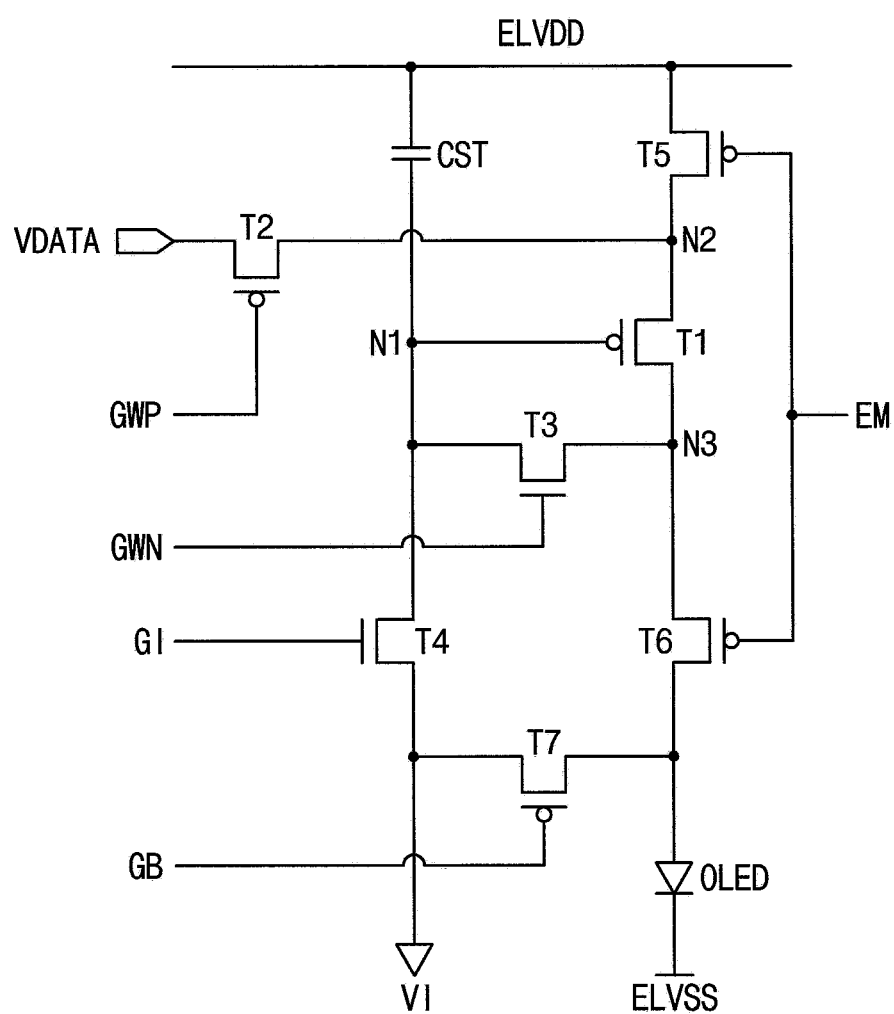
FIG. 14 is a circuit diagram illustrating a pixel of a display panel according to some example embodiments of the present inventive concept.
Figure 15:
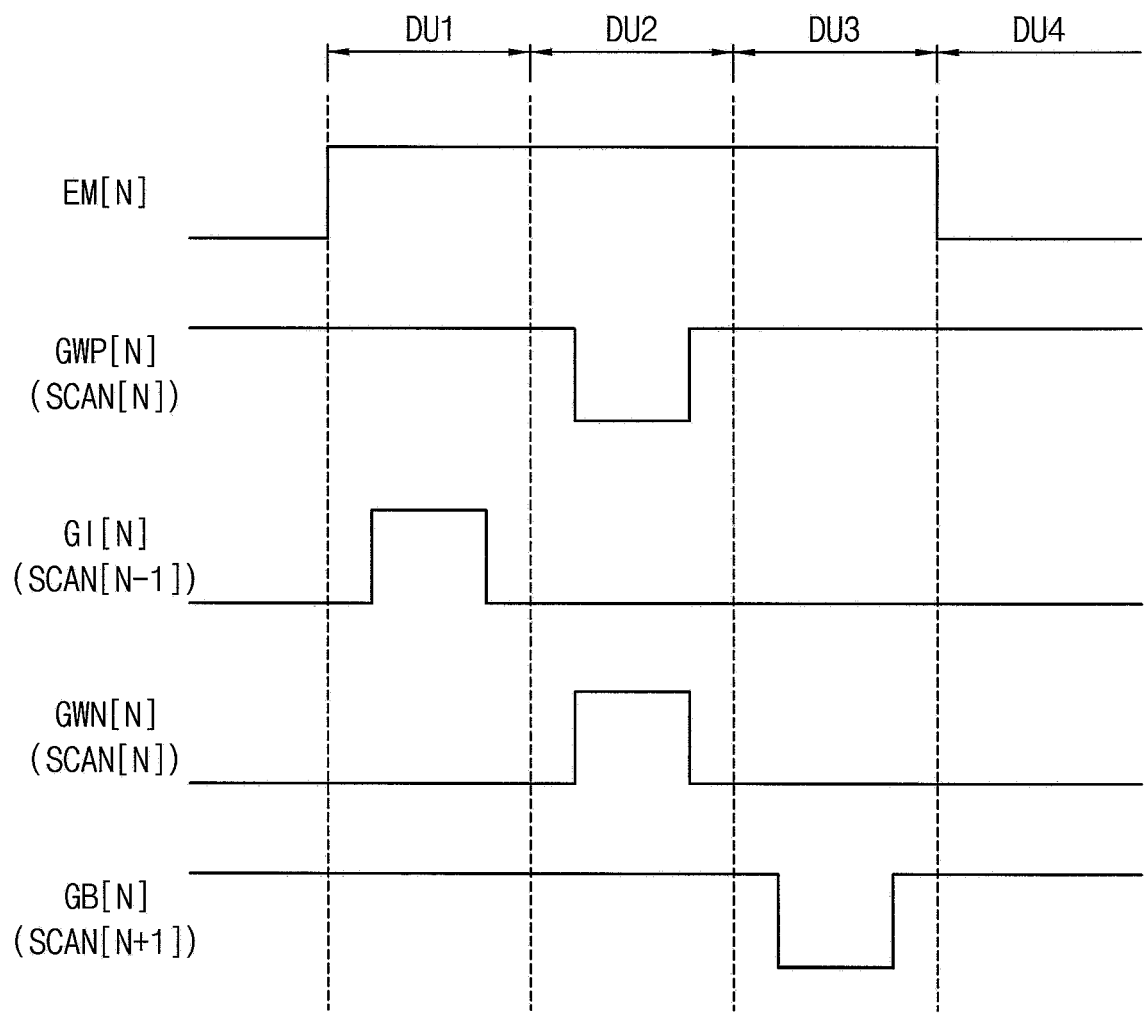
FIG. 15 is a timing diagram illustrating input signals applied to the pixel of FIG. 14.

FIG. 14 is a circuit diagram illustrating a pixel of a display panel 100 according to some example embodiments of the present inventive concept. FIG. 15 is a timing diagram illustrating input signals applied to the pixel of FIG. 14.

The display apparatus and the method of driving the display panel according to the present example embodiment is substantially the same as the display apparatus and the method of driving the display panel of the previous example embodiment explained referring to FIGS. 1 to 9 except for the structure of the pixel. Thus, the same reference numerals will be used to refer to the same or like parts as those described in the previous example embodiment of FIGS. 1 to 9 and some repetitive explanation concerning the above elements may be omitted.

Referring to FIGS. 1, 4 to 9, 14 and 15, the display apparatus includes a display panel 100 and a display panel driver. The display panel driver includes a driving controller 200, a gate driver 300, a gamma reference voltage generator 400, a data driver 500, and an emission driver 600.

The display panel 100 includes a plurality of the pixels. Each pixel includes an organic light emitting element OLED.

The pixel receives a data write gate signal GWP and GWN, a data initialization gate signal GI, an organic light emitting element initialization signal GB, the data voltage VDATA and the emission signal EM and the organic light emitting element OLED of the pixel emits light corresponding to the level of the data voltage VDATA to display the image.

According to some example embodiments, the pixel may include a switching element of a first type and a switching element of a second type different from the first type. For example, the switching element of the first type may be a polysilicon thin film transistor. For example, the switching element of the first type may be a low temperature polysilicon (LTPS) thin film transistor. For example, the switching element of the second type may be an oxide thin film transistor. For example, the switching element of the first type may be a P-type transistor and the switching element of the second type may be an N-type transistor.

At least one of the pixels may include first to seventh pixel switching elements T1 to T7, a storage capacitor CST and the organic light emitting element OLED.

According to some example embodiments, the seventh pixel switching element T7 includes a control electrode to which the organic light emitting element initialization gate signal GB is applied, an input electrode to which the initialization voltage VI is applied and an output electrode connected to the anode electrode of the organic light emitting element OLED.

For example, the seventh pixel switching element T7 may be the polysilicon thin film transistor. For example, the seventh pixel switching element T7 may be a P-type thin film transistor.

In FIG. 15, during a first duration DU1, the first node N1 and the storage capacitor CST are initialized in response to the data initialization gate signal GI. During a second duration DU2, a threshold voltage |VTH| of the first pixel switching element T1 is compensated and the data voltage VDATA of which the threshold voltage |VTH| is compensated is written to the first node N1 in response to the first and second data write gate signals GWP and GWN. During a third duration DU3, the anode electrode of the organic light emitting element OLED is initialized in response to the organic light emitting element initialization gate signal GB. During a fourth duration DU4, the organic light emitting element OLED emit the light in response to the emission signal EM so that the display panel 100 displays the image.

According to some example embodiments, the active level of the organic light emitting element initialization signal GB may be a low level.

According to some example embodiments, some of the pixel switching elements may be designed using the oxide thin film transistors. According to some example embodi-ments, the third pixel switching element T3 and the fourth pixel switching element T4 may be the oxide thin film transistors. The first pixel switching element T1, the second pixel switching element T2, the fifth pixel switching element T5, the sixth pixel switching element T6 and the seventh pixel switching element T7 may be the polysilicon thin film transistors.

The display panel 100 may be driven in a normal driving mode in which the display panel 100 is driven in a normal driving frequency and in a low frequency driving mode in which the display panel 100 is driven in a frequency less than the normal driving frequency.

The driving controller 200 may determine the low driving frequency corresponding to the input image data IMG in the low frequency driving mode. The driving controller 200 may determine a plurality of compensation frequencies greater than the low driving frequency. The driving controller 200 inserts a plurality of compensation frequency frames having the compensation frequencies prior to a low driving frequency frame having the low driving frequency.

According to some example embodiments, the plurality of the compensation frequency frames may be inserted prior to the low driving frequency frame in the low frequency driving mode so that the afterimage of the previous image or the flicker due to the hysteresis characteristics of the pixel switching elements may be prevented.

The flicker of the display panel 100 is prevented or reduced in the low frequency driving mode so that the power consumption of the display apparatus may be reduced and the display quality of the display panel 100 may be enhanced.

According to some example embodiments of the present inventive concept as explained above, the power consumption of the display apparatus may be reduced and the display quality of the display panel may be enhanced.

The foregoing is illustrative of the present inventive concept and is not to be construed as limiting thereof. Although a few example embodiments of the present inventive concept have been described, those skilled in the art will readily appreciate that many modifications are possible in the example embodiments without materially departing from the novel teachings and aspects of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific example embodiments disclosed, and that modifications to the disclosed example embodiments, as well as other example embodiments, are intended to be included within the scope of the appended claims. The present inventive concept is defined by the following claims, with equivalents of the claims to be included therein.

What is claimed is:

1. A display apparatus comprising:
    a display panel comprising a pixel, the pixel comprising a switching element of a first type and a switching element of a second type different from the first type;
    a gate driver configured to output a gate signal to the display panel;
    a data driver configured to output a data voltage to the display panel;

an emission driver configured to output an emission signal to the display panel; and a driving controller configured to:
- determine a low driving frequency corresponding to input image data, wherein the low driving frequency is a minimum frequency in which a flicker does not occur when a static image is displayed on the display panel;
- determine a plurality of compensation frequencies greater than the low driving frequency; and
- insert a plurality of compensation frequency frames having the compensation frequencies prior to a low driving frequency frame having the low driving frequency in a low frequency driving mode.

2. The display apparatus of claim 1, wherein the switching element of the second type is configured to be driven in the low driving frequency and the switching element of the first type is configured to be driven in a first driving frequency greater than the low driving frequency in the low frequency driving mode.

3. The display apparatus of claim 2, wherein the switching element of the first type and the switching element of the second type are configured to be driven in a normal driving frequency in a normal driving mode.

4. The display apparatus of claim 3, wherein the first driving frequency is the normal driving frequency.

5. The display apparatus of claim 1, wherein the driving controller is configured to determine a first compensation frequency and a second compensation frequency,
- wherein the first compensation frequency is a normal driving frequency of a normal driving mode, and
- wherein the second compensation frequency is less than the normal driving frequency and greater than the low driving frequency.

6. The display apparatus of claim 1, wherein the driving controller is configured to determine a first compensation frequency and a second compensation frequency less than the first compensation frequency, and
- wherein a first compensation frequency frame having the first compensation frequency is inserted prior to a second compensation frequency frame having the second compensation frequency.

7. The display apparatus of claim 1, wherein the driving controller is configured to determine a first compensation frequency and a second compensation frequency less than the first compensation frequency,
- wherein a plurality of first compensation frequency frames having the first compensation frequency is inserted, and
- wherein a plurality of second compensation frequency frames having the second compensation frequency is inserted.

8. The display apparatus of claim 1, wherein the compensation frequency frames having at least two compensation frequencies are repetitively inserted until a predetermined count is satisfied.

9. The display apparatus of claim 1, wherein the compensation frequency frames having at least two compensation frequencies are repetitively inserted until a predetermined condition is satisfied.

10. The display apparatus of claim 1, wherein the driving controller is configured to insert the compensation frequency frames when an image transition of the input image data occurs from a first static image to a second static image different from the first static image.

11. The display apparatus of claim 1, wherein the driving controller is configured to generate the compensation frequencies by repetitively dividing a normal driving frequency of a normal driving mode by a parameter.

12. The display apparatus of claim 11, wherein the driving controller is configured to determine the normal driving frequency as a first compensation frequency,
- wherein the driving controller is configured to determine a second compensation frequency by dividing the normal driving frequency by the parameter when the second compensation frequency is greater than the low driving frequency, and
- wherein the driving controller is configured to determine a third compensation frequency by dividing the second compensation frequency by the parameter when the third compensation frequency is greater than the low driving frequency.

13. The display apparatus of claim 1, wherein the driving controller is configured to generate the compensation frequencies by repetitively multiplying a parameter by the low driving frequency.

14. The display apparatus of claim 13, wherein the driving controller is configured to determine an N-th compensation frequency by multiplying the parameter by the low driving frequency when the N-th compensation frequency is less than a normal driving frequency of a normal driving mode,
- wherein the driving controller is configured to determine an (N−1)-th compensation frequency by multiplying the parameter by the N-th compensation frequency when the (N−1)-th compensation frequency is less than the normal driving frequency, and
- wherein N is a natural number equal to or greater than two.

15. The display apparatus of claim 1, wherein the switching element of the first type is a polysilicon thin film transistor, and
- wherein the switching element of the second type is an oxide thin film transistor.

16. The display apparatus of claim 15, wherein the switching element of the first type is a P-type transistor, and
- wherein the switching element of the second type is an N-type transistor.

17. The display apparatus of claim 15, wherein the pixel comprises:
- a first pixel switching element comprising a control electrode connected to a first node, an input electrode connected to a second node and an output electrode connected to a third node;
- a second pixel switching element comprising a control electrode configured to receive a first data write gate signal, an input electrode configured to receive the data voltage, and an output electrode connected to the second node;
- a third pixel switching element comprising a control electrode configured to receive a second data write gate signal, an input electrode connected to the first node, and an output electrode connected to the third node;
- a fourth pixel switching element comprising a control electrode configured to receive a data initialization gate signal, an input electrode configured to receive an initialization voltage, and an output electrode connected to the first node;
- a fifth pixel switching element comprising a control electrode configured to receive the emission signal, an input electrode configured to receive a high power voltage, and an output electrode connected to the second node;
- a sixth pixel switching element comprising a control electrode configured to receive the emission signal, an input electrode connected to the third node and an output electrode connected to an anode electrode of an organic light emitting element;

a seventh pixel switching element comprising a control electrode configured to receive an organic light emitting element initialization gate signal, an input electrode configured to receive the initialization voltage, and an output electrode connected to the anode electrode of the organic light emitting element;

a storage capacitor comprising a first electrode configured to receive the high power voltage, and a second electrode connected to the first node; and the organic light emitting element comprising the anode electrode connected to the output electrode of the sixth pixel switching element and a cathode electrode configured to receive a low power voltage.

18. The display apparatus of claim 17, wherein the first pixel switching element, the second pixel switching element, the fifth pixel switching element and the sixth pixel switching element are polysilicon thin film transistors, and wherein the third pixel switching element, the fourth pixel switching element, and the seventh pixel switching element are oxide thin film transistors.

19. The display apparatus of claim 17, wherein the first pixel switching element, the second pixel switching element, the fifth pixel switching element, the sixth pixel switching element, and the seventh pixel switching element are polysilicon thin film transistors, and wherein the third pixel switching element and the fourth pixel switching element are oxide thin film transistors.

20. A method of driving a display panel, the method comprising:

determining a low driving frequency corresponding to input image data in a low frequency driving mode wherein the low driving frequency is a minimum frequency in which a flicker does not occur when a static image is displayed on the display panel;

determining a plurality of compensation frequencies greater than the low driving frequency in the low frequency driving mode;

outputting a gate signal to the display panel comprising a pixel, the pixel comprising a switching element of a first type and a switching element of a second type different from the first type based on the low driving frequency and the compensation frequencies;

outputting a data voltage to the display panel; and outputting an emission signal to the display panel, wherein a plurality of compensation frequency frames having the compensation frequencies is inserted prior to a low driving frequency frame having the low driving frequency in the low frequency driving mode.

* * * * *